United States Patent
Nakano et al.

(10) Patent No.: US 6,334,087 B1
(45) Date of Patent: *Dec. 25, 2001

(54) SYSTEM, METHOD, AND COMPUTER PROGRAM FOR PROVIDING MAP INFORMATION FROM A SERVER TO MOVABLE TERMINALS

(75) Inventors: Nobuyuki Nakano, Katano; Akihiro Suzuki, Neyagawa; Yasuhiro Ihara, Osaka; Hisaya Fukuda, Sakai, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,839

(22) Filed: Apr. 30, 1998

(30) Foreign Application Priority Data

May 1, 1997 (JP) .................................................. 9-114049

(51) Int. Cl.[7] ...................................................... G01C 21/00

(52) U.S. Cl. ............................................................ 701/208

(58) Field of Search ................................. 701/208, 209; 342/357.09, 357.11; 340/988

(56) References Cited

U.S. PATENT DOCUMENTS

| | | | | |
|---|---|---|---|---|
| 5,025,261 | * | 6/1991 | Ohta et al. ........................ | 342/357.09 |
| 5,625,668 | * | 4/1997 | Loomis et al. ................... | 342/357.09 |
| 5,712,899 | * | 1/1998 | Pace, II ............................. | 340/988 |
| 5,808,566 | * | 9/1998 | Behr et al. ........................ | 340/995 |
| 5,933,100 | * | 8/1999 | Golding ............................ | 340/995 |
| 5,987,381 | * | 11/1999 | Oshizawa ......................... | 701/209 |

FOREIGN PATENT DOCUMENTS

| | | |
|---|---|---|
| 41 39 581 | 6/1993 | (DE) . |
| 195 21 929 | 4/1996 | (DE) . |
| 0 379 198 | 7/1990 | (EP) . |
| 0 697 580 | 2/1996 | (EP) . |
| 0 715 289 | 6/1996 | (EP) . |
| 0 785 535 | 7/1997 | (EP) . |
| 9-8917 | 1/1997 | (JP) . |
| 96 00373 | 1/1996 | (WO) . |

OTHER PUBLICATIONS

Zavoli et al, "Customer Location Services". IEEE Proceedings on Vehicle Navigation and Information Systems Conf. 1994, pp. 613–617.*

* cited by examiner

*Primary Examiner*—Gregory C. Issing
(74) *Attorney, Agent, or Firm*—Wenderoth, Lind & Ponack, L.L.P.

(57) ABSTRACT

An object is to realize a server/client-type map information providing system capable of providing detailed, wide-ranging map related information through telecommunications at low costs, and a server side is provided with databases (9 to 12) storing the map related information. When notified of position information from a mobile terminal side, a processing portion 15 performs a route search referring to map data in the map database 9 based on the position information. The processing portion 15 then extracts Information related to the obtained route (route related information) from the databases (9 to 12) to transmit the information with the route to the mobile terminal side. In this way, since the mobile terminal side needs only the information that is closely related to the route in the map related information, only the route related information is transmitted, thereby reducing the amount of information to be transmitted compared to that when the map related information is downloaded as it is, and as a result it is possible to provide detailed, wide-ranging map related information through telecommunications at low costs.

38 Claims, 16 Drawing Sheets

F I G. 2
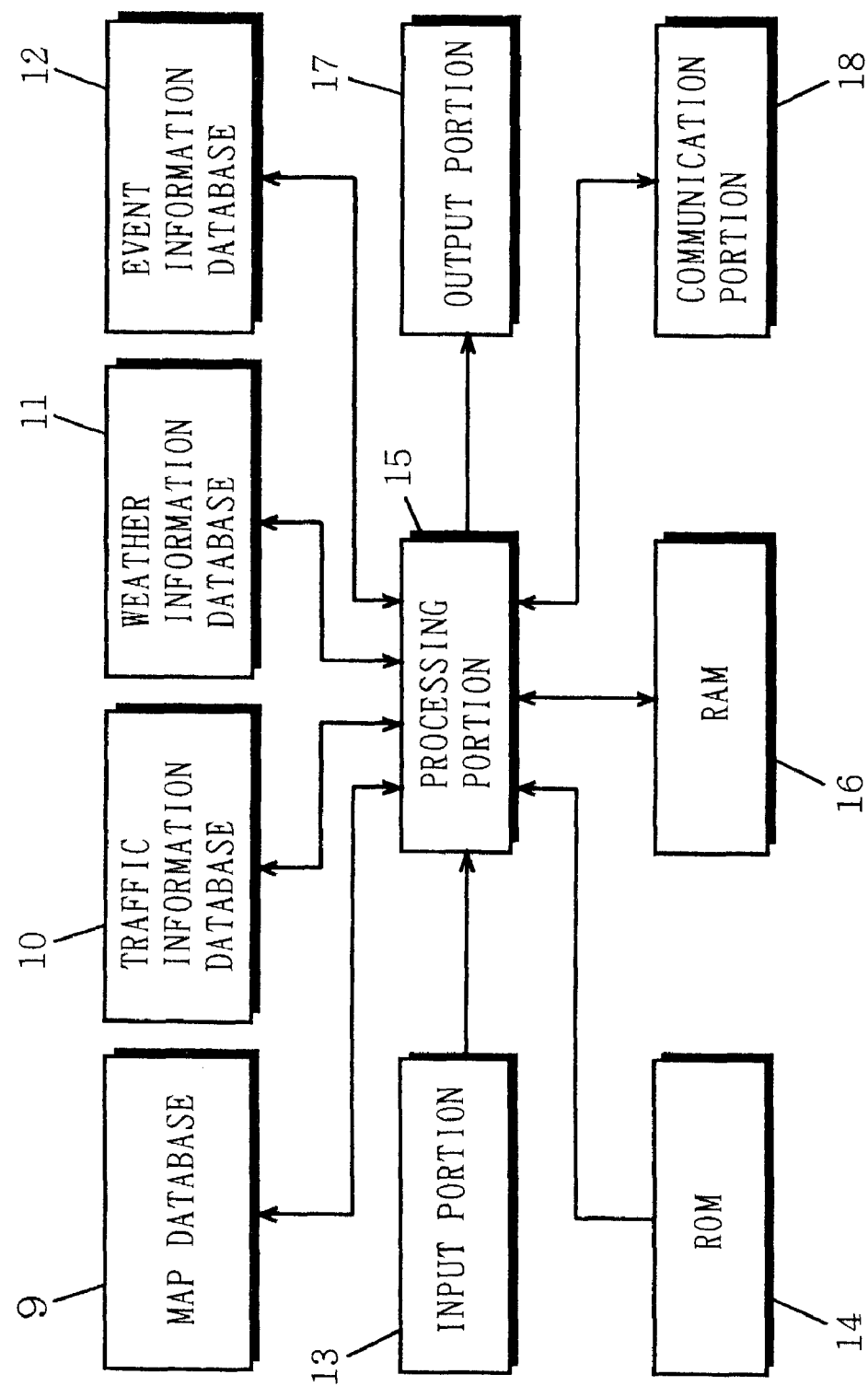

| ELEMENT ID | ELEMENT (BIT MAP) |
|---|---|
| 0 1 |  |
| 0 2 |  |
| 0 3 |  |
| 0 4 |  |
| 0 5 |  |
| 0 6 |  |
| 0 7 |  |
| 0 8 |  |
| 0 9 |  |
| 0 A |  |
| 0 B |  |
| 0 C |  |
| 0 D |  |
| 0 E |  |
| 0 F |  |

SYSTEM, METHOD, AND COMPUTER PROGRAM FOR PROVIDING MAP INFORMATION FROM A SERVER TO MOVABLE TERMINALS

BACKGROUND OF THE INVENTION

1. Field of the Invention

The present invention relates to map information providing systems, and more specifically to a map information providing system including one or more movable terminals for providing map information therefor through telecommunications.

2. Description of the Background Art

In recent years, vehicles adopting a navigation system has increased in population. The information the navigation system provides also has been expanding from map information to information further including, for example, traffic information and event information (hereinafter referred to as map related information.) The navigation system is expected to become rapidly available in the future as it becomes more convenient.

The conventional vehicle navigation system generally provides information in such a way that a mobile terminal reads map information and map related information recorded in a read-only recording medium such as a CD-ROM as required.

However, in the conventional system using a read-only recording medium, it is difficult to provide map related information including information with a high degree of real-time characteristics such as traffic information and weather information.

Therefore, a vehicle navigation system capable of further providing map related information including information with a high degree of real-time characteristics is disclosed. For example, Japanese Patent Laying-Open No. 9-8917 discloses an art as to a device which downloads map information and map related information from an information providing center through a communications circuit to a mobile terminal.

However, in the conventional system which provides information through telecommunications as disclosed in the above gazette, since telecommunications costs increase as the amount of information to be transmitted increases, it is impossible to provide detailed, wide-ranging map related information at low costs.

SUMMARY OF THE INVENTION

Therefore, an object of the present invention is to realize a map information providing system capable of providing detailed, wide-ranging map related information from a server to a movable terminal through telecommunications at low costs.

The present invention has the following features to solve the problem mentioned above.

A first aspect is directed to a map information providing system provided with a server and one or more movable terminals for providing map information from the server to the one or more movable terminals, the server comprising:
an information storage portion for storing map related information including the map information;
a route searching portion for performing a route search referring to the map information based on a position information of which the server is notified by the one or more movable terminals;
a route related information extracting portion for extracting information related to a route obtained by a search by the route searching portion from the map related information stored in the information storage portion; and
a communication portion for notifying the one or more movable terminals of the route related information obtained by extraction by the route related information extracting portion through telecommunication.

As described above, in the first aspect, stored in the server is map related information including map information, and the server performs route search referring to the map information based on the position information of which the server is notified from the movable terminal. The server then extracts information related to the route obtained by search (route related information) from the map related information and then notifies the movable terminal of the information. In this way, since the movable terminal side needs only the information that is closely related to the route in the map related information, only the route related information is transmitted, reducing the amount of information to be transmitted compared to that when the map related information is transmitted, and as a result it is possible to provide detailed, wide-ranging map related information through telecommunications at low costs.

According to a second aspect, in the first aspect, the one or more movable terminals are each mobile terminals.

As described above, in the second aspect, a memory or a hard disk with comparatively small capacity is installed in the mobile terminal because of the limitation of capacity. Thus, a reduction in the amount of information to be transmitted/stored is highly required, and therefore the effect obtained by reduction is significant.

According to a third aspect, in the first aspect, the one or more movable terminals are each portable terminals.

As described above, in the third aspect, a memory or a hard disk with small capacity is installed in the portable terminal because of the limitation of capacity. Thus, a reduction in the amount of information to be transmitted/stored is especially highly required, and therefore the effect obtained by reduction is extremely significant.

According to a fourth aspect, in the first aspect,
the communication portion notifies the one or more movable terminals of the route related information obtained by an extraction by the route related information extracting portion by converting the information into an identifier capable of identifying the information,
the one or more movable terminals each comprising:
a terminal side information storage portion for storing map related information equal to the map related information stored in the information storage portion; and
an information reading portion for reading information corresponding to the identifier of which the one or more movable terminals are notified by the server from the map related information stored in the terminal side information storage portion.

As described above, in the fourth aspect, the route related information is converted to an identifier of the information and then transmitted, thereby significantly reducing the amount of information to be transmitted.

According to a fifth aspect, in the fourth aspect, the one or more movable terminals are each mobile terminals.

According to a sixth aspect, in the fourth aspect, the one or more movable terminals are each portable terminals.

According to a seventh aspect, in the first aspect,
the communication portion notifies the one or more movable terminals of the route related information obtained by extraction by the route related information extracting portion by converting the information into a group of identifiers capable of identifying one or more elements which construct the map information;

the one or more movable terminals each comprising:
- a terminal side information storage portion for storing elements which construct map related information equal to the map related information stored in the information storage portion; and
- an element reading portion for reading one or more elements corresponding to the group of identifiers of which the one or more movable terminals are notified by the server from the elements stored in the terminal side information storage portion.

As described above, in the seventh aspect, the route related information is converted to a group of identifiers of the elements which construct the information and then transmitted, thereby significantly reducing the amount of information to be transmitted. Further, since the movable terminal side is only required to store the elements of the map related information, the amount of information to be stored is reduced compared to that when the route related information is converted into the identifier of the information and then transmitted, and as a result it is possible to make the capacity of a memory or a hard disk at the movable terminal side small. Further, it is possible to represent wide-ranging map related information by combinations of the group of identifiers, thereby obtaining high general versatility of the information contents to be transmitted considering the amount of information to be transmitted through telecommunications.

According to an eighth aspect, in the seventh aspect, the one or more movable terminals are each mobile terminals.

According to a ninth aspect, in the seventh aspect, the one or more movable terminals are each portable terminals.

According to a tenth aspect, in the seventh aspect, the system further comprises:
- an element updating/adding portion for updating the elements stored in the terminal side information storage portion or adding a new element to the elements stored in the terminal side information storage portion as the map related information stored in the information storage portion is updated or new information is added to the map related information stored in the information storage portion.

As described above, in the tenth aspect, since the element updating or adding at the movable terminal side is made as map related information updating or adding at the server side is made, it is possible to provide the latest, wide-ranging information.

According to an eleventh aspect, in the seventh aspect, the one or more movable terminals each further comprises:
- a template storage portion for storing templates showing a structure of the map related information stored in the information storage portion; and
- a restoring portion for restoring the one or more elements read by the element reading portion to map related information equal to the map related information stored in the information storage portion based on the template stored in the template storage portion.

As described above, in the eleventh aspect, restoring processing is performed based on the template, allowing reduction in processing operation at the movable terminal side. For example, if the display coordinates and display colors of the elements are written as the templates, these kinds of information do not have to be transmitted, thereby reducing the amount of information to be transmitted.

According to a twelfth aspect, in the eleventh aspect, the one or more movable terminals are each mobile terminals.

According to a thirteenth aspect, in the eleventh aspect, the one or more movable terminals are each portable terminals.

According to a fourteenth aspect, in the eleventh aspect, the system further comprises:
- a template updating/adding portion for updating the templates stored in the template information storage portion or adding a new template to the templates stored in the template storage portion as the map related information stored in the information storage portion is updated or new information is added to the map related information stored in the information storage portion.

As described above, in the fourteenth aspect, since template updating or adding at the movable terminal side is made as map related information updating or adding at the server side is made, it is possible to provide the latest, wide-ranging information.

According to a fifteenth aspect, in the seventh aspect, the server further comprises:
- a command storage portion for storing commands for subjecting the elements stored in the terminal side information storage portion to prescribed processing;
- a converting portion for converting the command stored in the command storage portion into an identifier capable of identifying the command; and
- a portion for notifying the one or more movable terminals of the identifier obtained by conversion by the converting portion through telecommunications, and the one or more movable terminals each further comprising:
- a command program storage portion for storing programs for executing the commands stored in the command storage portion; and
- a program reading portion for reading a program corresponding to the identifier of which the one or more movable terminals are notified by the server from the programs stored in the command program storage portion.

As described above, in the fifteenth aspect, since the elements are processed at the movable terminal side, it is possible to provide more detailed information with a minimum increase in the amount of information to be transmitted. Also, the command for processing is converted into the ID of the command and then transmitted, thereby allowing reduction in the amount of information to be transmitted.

According to a sixteenth aspect, in the fifteenth aspect, the one or more movable terminals are each mobile terminals.

According to a seventeenth aspect, in the fifteenth aspect, the one or more movable terminals are each portable terminals.

According to an eighteenth aspect, in the fifteenth aspect, the system further comprises:
- a program updating/adding portion for updating the programs stored in the command program storage portion or adding a new program to the programs stored in the command program storage portion as the commands stored in the command storage portion are updated or a new command is added to the commands stored in the command storage portion.

As described above, in the eighteenth aspect, since command program updating or adding at the movable terminal side is made as command updating/adding at the server side is made, it is possible to provide the latest, wide-ranging information.

A nineteenth aspect is directed to a map information providing system provided with a server and one or more movable terminals for providing map information from the server to the one or more movable terminals, the server comprising:
an information storage portion for storing map related information including the map information;
a first converting portion for converting the information stored in the information storage portion into an identifier capable of identifying the information; and
a portion for notifying the one or more movable terminals of the identifier obtained by conversion by the first converting portion through telecommunications, and the one or more movable terminals each comprising:
a terminal side information storage portion for storing map related information equal to the map related information stored in the information storage portion; and
an information reading portion for reading information corresponding to the identifier transmitted from the server from the map related information stored in the terminal side information storage portion.

As described above, in the nineteenth aspect, the map related information is converted to an identifier of the information and then transmitted, thereby significantly reducing the amount of information to be transmitted.

According to a twentieth aspect, in the nineteenth aspect, the one or more movable terminals are each mobile terminals.

According to a twenty-first aspect, in the nineteenth aspect, the one or more movable terminals are each portable terminals.

A twenty-second aspect is directed to a map information providing system provided with a server and one or more movable terminals for providing map information from the server to the one or more movable terminals, the server comprising:
an information storage portion for storing map related information including the map information;
a first converting portion for converting the information stored in the information storage portion into a group of identifiers capable of identifying one or more elements which construct the information; and
a portion for notifying the one or more movable terminals of the group of identifiers obtained by conversion by the first converting portion through telecommunications, and the one or more movable terminals each comprising:
a terminal side information storage portion for storing elements which construct map related information equal to the map related information stored in the information storage portion; and
an element reading portion for reading one or more elements corresponding to the group of identifiers of which the one or more movable terminals are notified by the server from the elements stored in the terminal side information storage portion.

As described above, in the twenty-second aspect, the map related information is converted to the group of identifiers of the elements which construct the information and then transmitted, thereby significantly reducing the amount of information to be transmitted. Further, since the movable terminal side is only required to store the elements of the map related information, the amount of information to be stored is reduced compared to that when the map related information is converted into the identifier of the information and then transmitted, and as a result it is possible to make the capacity of a memory or a hard disk at the movable terminal side small. Further, it is possible to represent wide-ranging map related information by combinations of the group of identifiers, thereby obtaining high general versatility of the information contents to be transmitted considering the amount of information to be transmitted through telecommunications.

According to a twenty-third aspect, in the twenty-second aspect, the one or more movable terminals are each mobile terminals.

According to a twenty-fourth aspect, in the twenty-second aspect, the one or more movable terminals are each portable terminals.

According to a twenty-fifth aspect, in the twenty-second aspect, the system further comprises:
an element updating/adding portion for updating the elements stored in the terminal side information storage portion or adding a new element to the elements stored in the terminal side information storage portion as the map related information stored in the information storage portion is updated or new information is added to the map related information stored in the information storage portion.

As described above, in the twenty-fifth aspect, since element updating or adding at the movable terminal side is made as map related information updating or adding at the server side is made, it is possible to provide the latest, wide-ranging information.

According to a twenty-sixth aspect, in the twenty-second aspect, the one or more movable terminals each further comprises:
a template storage portion for storing templates showing a structure of the map related information stored in the information storage portion: and
a restoring portion for restoring the one or more elements read by the element reading portion to map related information equal to the map related information stored in the information storage portion based on the template stored in the template storage portion.

As described above, in the twenty-sixth aspect, restoring processing is performed based on the template, allowing a reduction in processing operation at the movable terminal side. For example, if the display coordinates and display colors of the elements are written as the templates, these kinds of information do not have to be transmitted, thereby reducing the amount of information to be transmitted.

According to a twenty-seventh aspect, in the twenty-sixth aspect, the one or more movable terminals are each mobile terminals.

According to a twenty-eighth aspect, in the twenty-sixth aspect, the one or more movable terminals are each portable terminals.

According to a twenty-ninth aspect, in the twenty-sixth aspect, the system further comprises:
a template updating/adding portion for updating the templates stored in the template storage portion or adding a new template to the templates stored in the template storage portion as the map related information stored in the information storage portion is updated or new information is added to the map related information stored in the information storage portion.

As described above, in the twenty-ninth aspect, since template updating or adding at the movable terminal side is made as map related information updating or adding at the server side is made, it is possible to provide the latest, wide-ranging information.

According to a thirtieth aspect, in the twenty-second aspect, the server further comprises:
a command storage portion for storing commands for subjecting the elements stored in the terminal side information storage portion to prescribed processing;
a second converting portion for converting the command stored in the command storage portion into an identifier capable of identifying the command; and
a portion for notifying the one or more movable terminals of the identifier obtained by conversion by the second converting portion through telecommunications, and the one or more movable terminals each comprises:
a command program storage portion for storing programs for executing the commands stored in the command storage portion; and
a program reading portion for reading a program corresponding to the identifier of which the one or more movable terminals are notified by the server from the programs stored in the command program storage portion.

As described above, in the thirtieth aspect, since the elements are processed at the movable terminal side, it is possible to provide more detailed information with a minimum increase in the amount of information to be transmitted. Further, instead of a command for processing, the identifier of the command is transmitted, thereby reducing the amount of information to be transmitted.

According to a thirty-first aspect, in the thirtieth aspect, the one or more movable terminals are each mobile terminals.

According to a thirty-second aspect, in the thirtieth aspect, the one or more movable terminals are each portable terminals.

According to a thirty-third aspect, in the thirtieth aspect, the system further comprises:
a program updating/adding portion for updating the programs stored in the command program storage portion or adding a new program to the programs stored in the command program storage portion as the commands stored in the command storage portion are updated or a new command is added to the commands stored in the command storage portion.

As described above, in the thirty-third aspect, since command program updating or adding at the movable terminal side is made as command updating or adding at the server side is made, it is possible to provide the latest, wide-ranging information.

A thirty-fourth aspect is directed to a method for providing map information for one or more movable terminals, comprising the steps of:
previously storing map related information including the map information;
searching for a route referring to the map information based on position information transmitted from the one or more movable terminals;
extracting information related to the route obtained by search from the map related information; and
notifying the one or more movable terminals of the route related information obtained by extraction through telecommunication.

As described above, in the thirty-fourth aspect, map related information including map information is previously stored, and route search is performed referring to the map information based on the position information transmitted from the movable terminal. Then, information related to the route obtained by search (route related information) is extracted from the map related information and then transmitted to the movable terminal. In this way, since the movable terminal side needs only the information that is closely related to the route in the map related information, only the route related information is transmitted, reducing the amount of information to be transmitted compared to that when the map related information is transmitted, and as a result it is possible to provide detailed, wide-ranging map related information through telecommunications at low costs.

A thirty-fifth aspect is directed to a recording medium storing a software program which is executed in a server and describes method for providing map information from the server to one or more movable terminals, the server previously storing map related information including the map information, and the software program being for realizing on the server an operating environment comprising the steps of:
searching for a route referring to the map information based on position information transmitted from the one or more movable terminals;
extracting information related to the route obtained by search from the map related information; and
notifying the one or more movable terminals of the route related information obtained by extraction through telecommunications.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing a basic structure of a server side in the map information providing system according to the first embodiment of the present invention;

DESCRIPTION OF THE PREFERRED EMBODIMENTS (1) First Embodiment

A map information providing system shown in the present embodiment is provided with a server holding various kinds of databases such as map data, traffic information, weather information, and event information, and collecting and updating the contents of these databases, and one or more mobile terminals for receiving information-providing services from the server through telecommunications. An optimum route between arbitrary points requested by the mobile terminal is obtained by the server, and in addition to the obtained route, a detailed map, traffic information, weather information, event information, etc., are downloaded in one operation to the mobile terminal. Described below is the detail referring to drawings.

Figure 1:
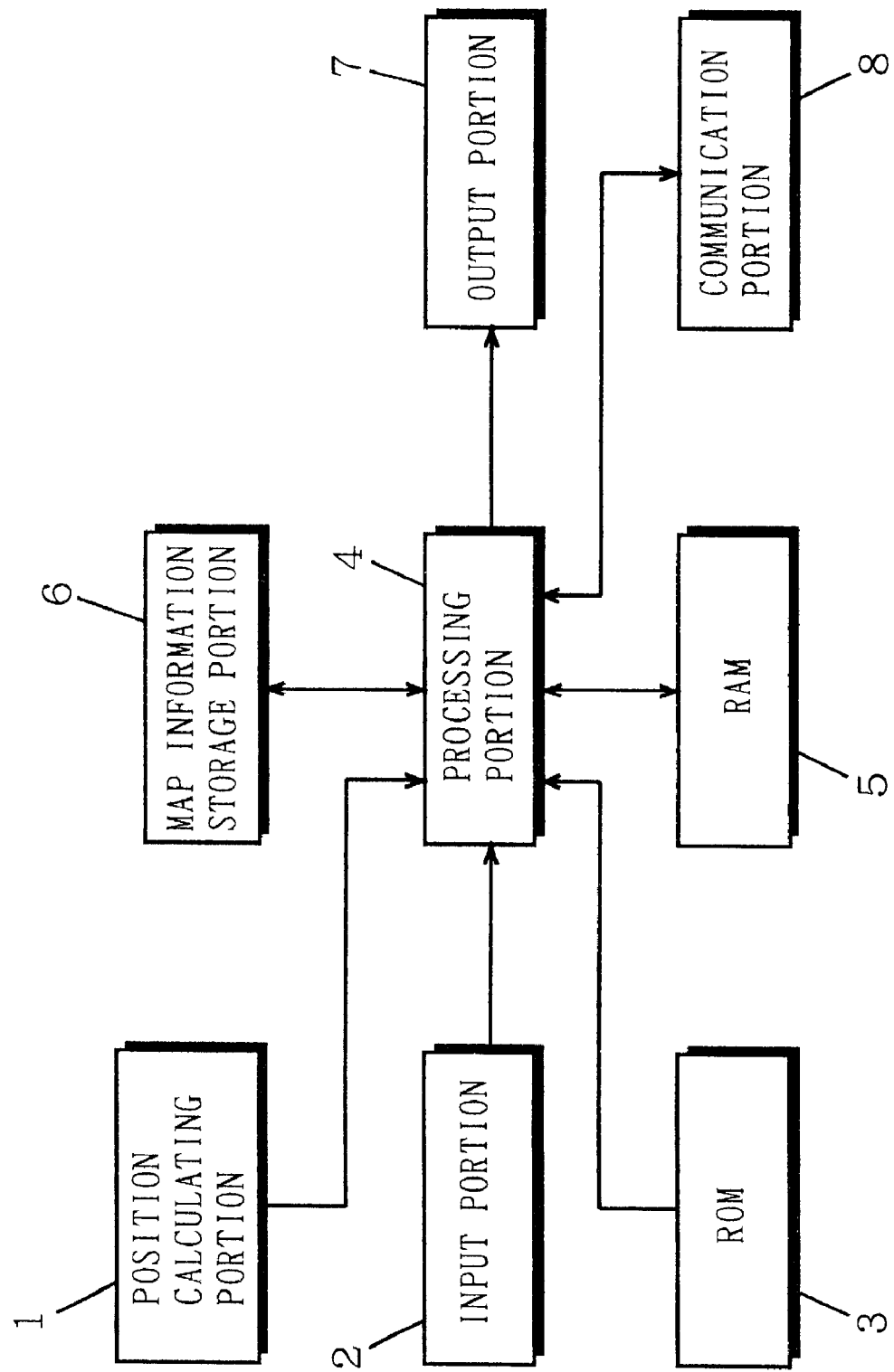
FIG. 1 is a block diagram showing a basic structure of a mobile terminal side in a map information providing system according to a first embodiment of the present invention.

FIG. 1 is a block diagram showing a basic structure of a mobile terminal side in the map information providing system according to the first embodiment of the present invention. In FIG. 1, the mobile terminal in the map information providing system of the present embodiment includes a position calculating portion 1, an input portion 2, ROM 3, a processing portion 4, RAM 5, a map information storage portion 6, an output portion 7, and a communication portion 8.

The position calculating portion 1 calculates a present position of a vehicle on a map. This is realized by each of the methods of detecting vehicle speed by a vehicle speed sensor to calculate distance traveled of the vehicle based on the speed, detecting the direction of travel of the vehicle by a gyroscopic sensor, correlating a trail of the vehicle with a road configuration on the map, receiving radio waves from a GPS satellite to detect an absolute position on the earth, or by combining the above methods.

The input portion 2 is for operational input by a driver to the mobile terminal and is realized by a body operational panel having a plurality of key switches, or a remote controller with the same function thereof. The ROM 3 stores a program for controlling the entire system. Instead of the ROM 3, a writable storage medium such as a flash memory may be provided to store the program provided in an online or off-line form.

The processing portion 4 controls the navigation system body according to the program stored in the ROM 3. The RAM 5 is a memory for expanding a program and data when the processing portion 4 performs processing according to the program stored in the ROM 3. The map information storage portion 6 is to store map data and its related information and is realized by a writable storage medium such as a flash memory or a hard disk.

The output portion 7 is to provide the driver with the map information and its related information stored in the map information storage portion 6 and the processed results of the processing portion 4 by images or sound, and constructed of, for example, a display and a speaker. The communication portion 8 is to transmit/receive data through a communications circuit between the mobile terminal and the server, and constructed of, for example, a cellular phone and a data communications modem for converting data between the cellular phone and the mobile terminal.

FIG. 2 is a block diagram showing a basic structure of the server side in the map information providing system according to the first embodiment of the present invention. In FIG. 2, the server in the map information providing system of the present embodiment includes a map database 9, a traffic information database 10, a weather information database 11, an event information database 12, an input portion 13, ROM 14, a processing portion 15, RAM 16, an output portion 17, and a communication portion 18.

The map database 9 is a database storing map data, and the map data stored in the database is downloaded for use from the server to the mobile terminal or is used for route searching processing on the server. The traffic information database 10 is a database storing traffic information items such as information about congested roads, regulation information, information about accidents, and these information items are transmitted to the mobile terminal as requested. The weather information database 11 is a database storing weather information items such as weather forecasts and rainfall conditions, and these information items are transmitted to the mobile terminal as requested.

The event information database 12 is a database storing various kinds of event information, and the information is transmitted to the mobile terminal as required. The input portion 13 is to input information based on the operation by the driver and other external information to the server body. The ROM 14 stores a program for controlling the entire system. Instead of the ROM 14, a writable storage medium such as a flash memory may be provided to store a program provided in an online or off-line form.

The processing portion 15 controls the server body according to the program stored in the ROM 14. The RAM 16 is a memory to expand a program and data when the processing portion 15 performs processing according to the program stored in the ROM 14. The output portion 17 is to provide the driver with the processed results of the processing portion 15 by images or sound. The communication portion 18 is to transmit/receive data through a communications circuit between the server and the mobile terminal, and is constructed of, for example, a telephone, and a data communications modem for converting data between the telephone and the server.

Described below is an operation of the map information providing system as constructed above. Each step of processing shown in the present embodiment can be realized with software using a computer or can be realized using a dedicated hardware circuit for performing each step of processing.

Figure 3:
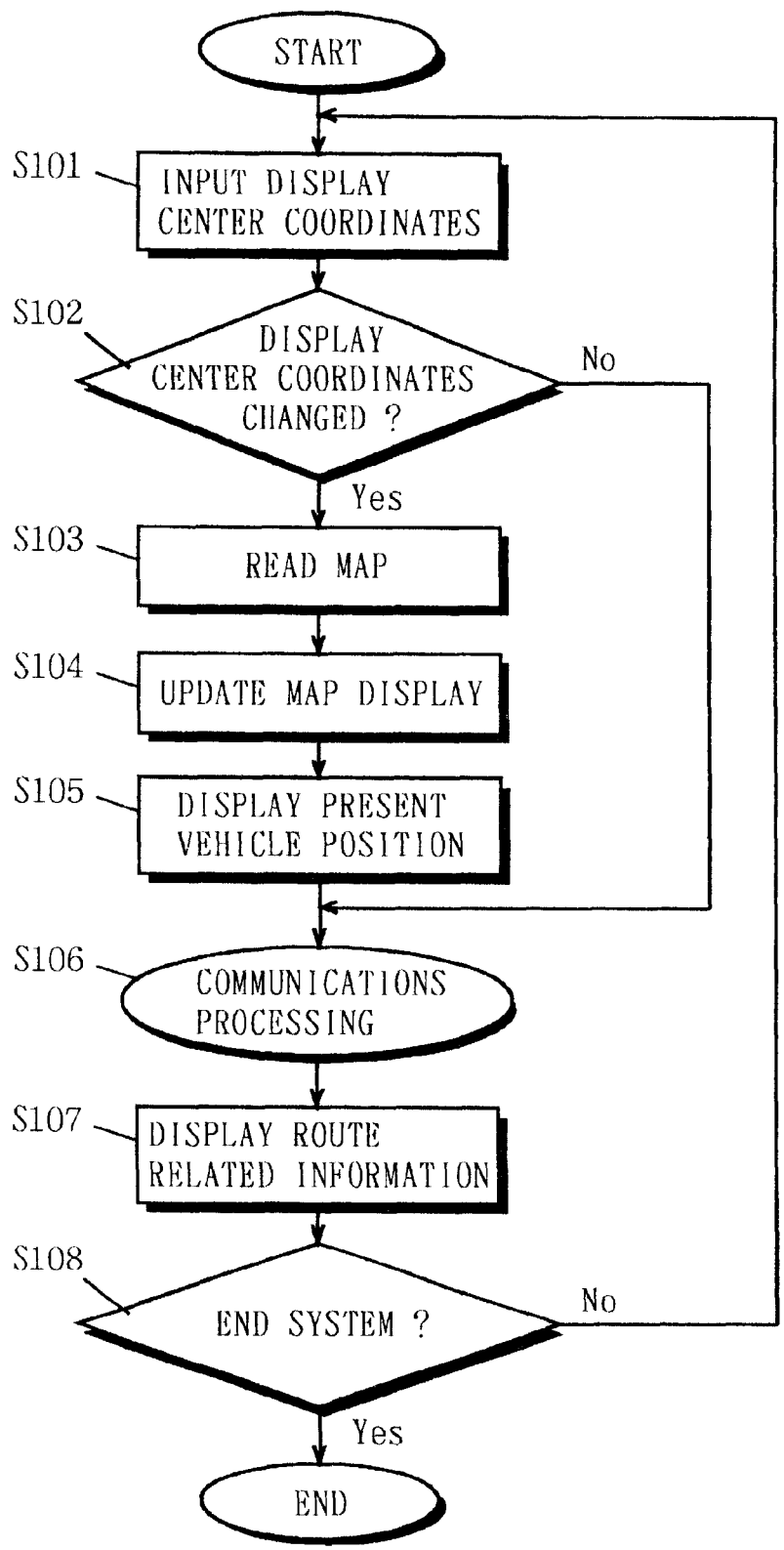
FIG. 3 is a flow chart describing the procedure of processing at the mobile terminal side in the map information providing system of the first embodiment.
Figure 9:
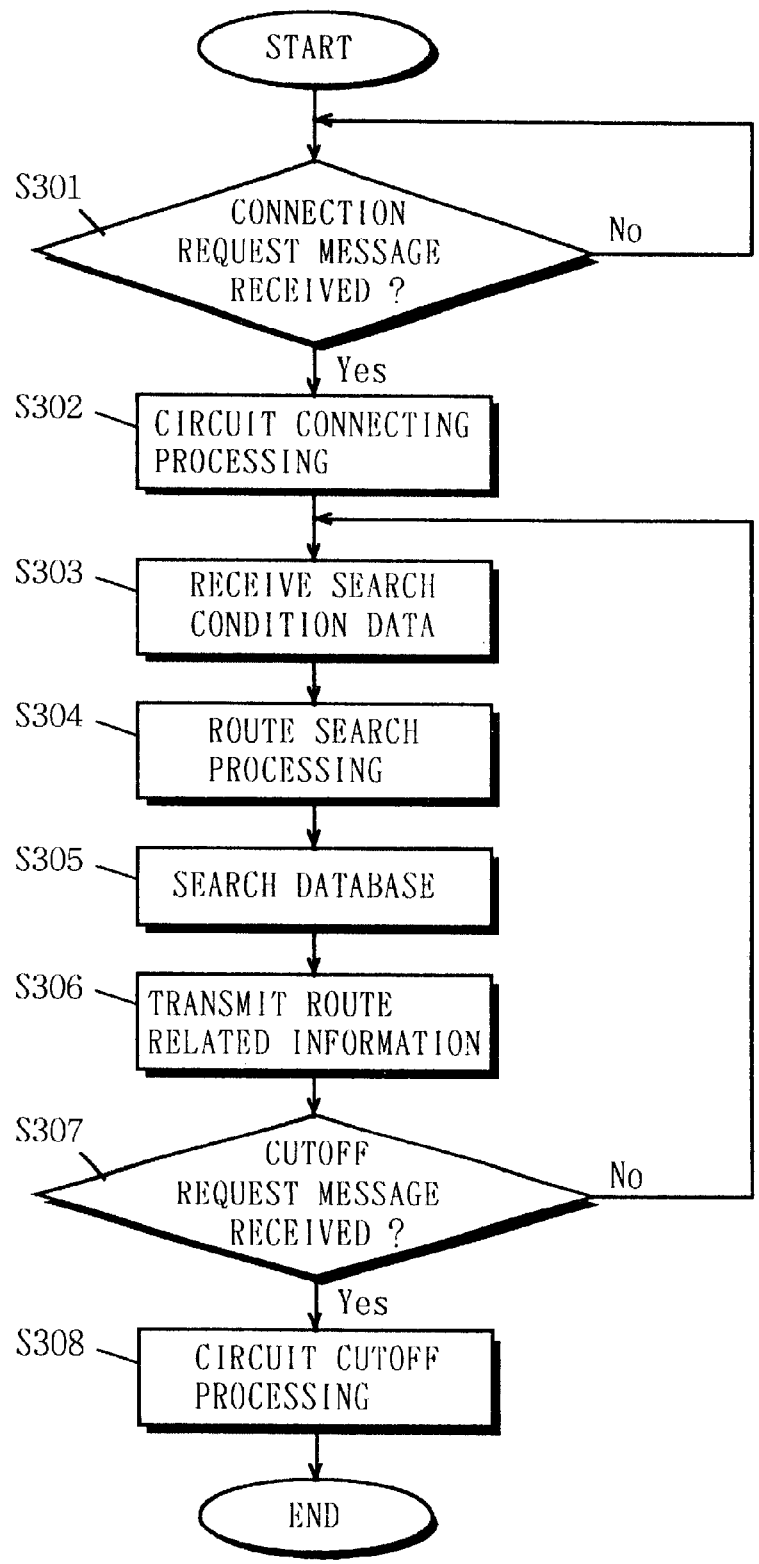
FIG. 9 is a flow chart describing the procedure of processing at the server side in the map information providing system of the first embodiment.

FIG. 3 is a flow chart describing the procedure of processing at the mobile terminal side in the map information providing system of the present embodiment. In addition, FIG. 9 is a flow chart describing the procedure of processing at the server side in the map information providing system of the present embodiment. Described below is processing operation of the map information providing system of the present embodiment according to these flow charts.

First, described is the procedure of processing at the mobile terminal side according to the flow chart of FIG. 3.

In the mobile terminal, the input portion 2 inputs coordinates of an arbitrary point provided by the driver or coordinates of the present position of the vehicle calculated at the position calculating portion 1 as display center coordinates of the map to the processing portion 4 (step S101). Next, the processing portion 4 compares the coordinates inputted in step S101 to coordinates previously inputted to determine whether or not the display center coordinates have been changed (step S102). As a result of determination, when there is no change, the processing goes to step S106, and when there is a change, the processing goes to step S103.

Figure 10:
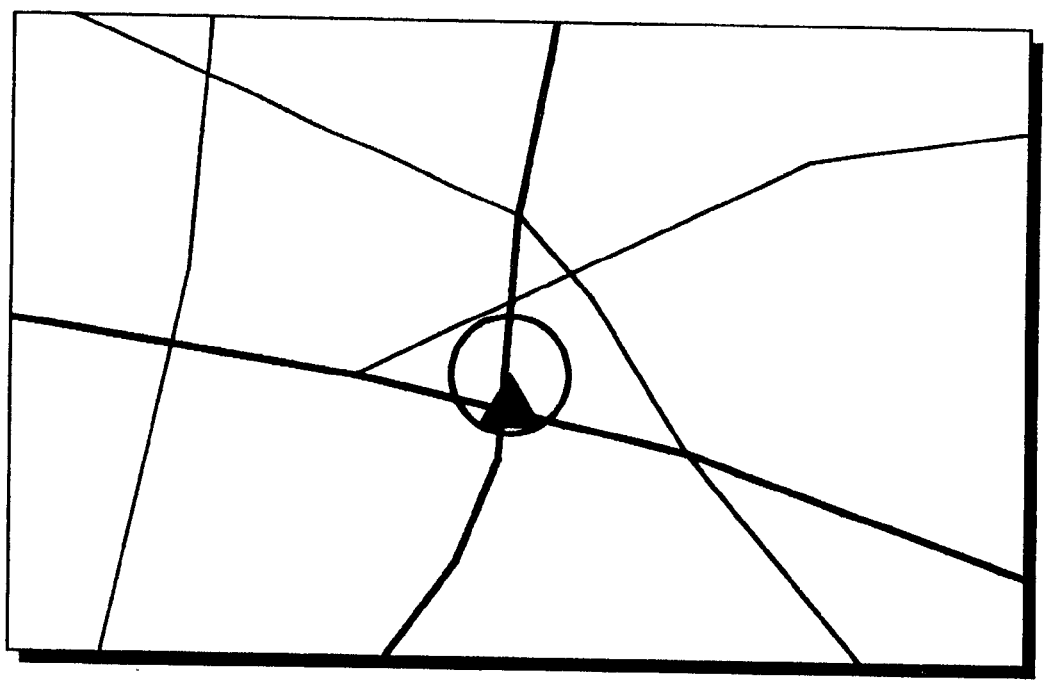
FIG. 10 is a diagram showing an example of a state in which a present position mark of a vehicle is displayed on a map.

The processing portion 4 then reads out the map data of the display center coordinates inputted in step S101 from the map information storage portion 6 (step S103). Then, the processing portion 4 makes the output portion 7 display the new map data read in step S103 for driver (step S104). When the present position coordinates of the vehicle is included on the map displayed in step S104, a present vehicle position mark is superposed on the map for display (step S105). Shown in FIG. 10 is an example of a state in which the present vehicle position mark is displayed on the map. When the display center coordinates inputted in step S101 are equal to the coordinates of the present position of the vehicle, the present vehicle position mark is displayed at the center of a screen.

Figure 4:
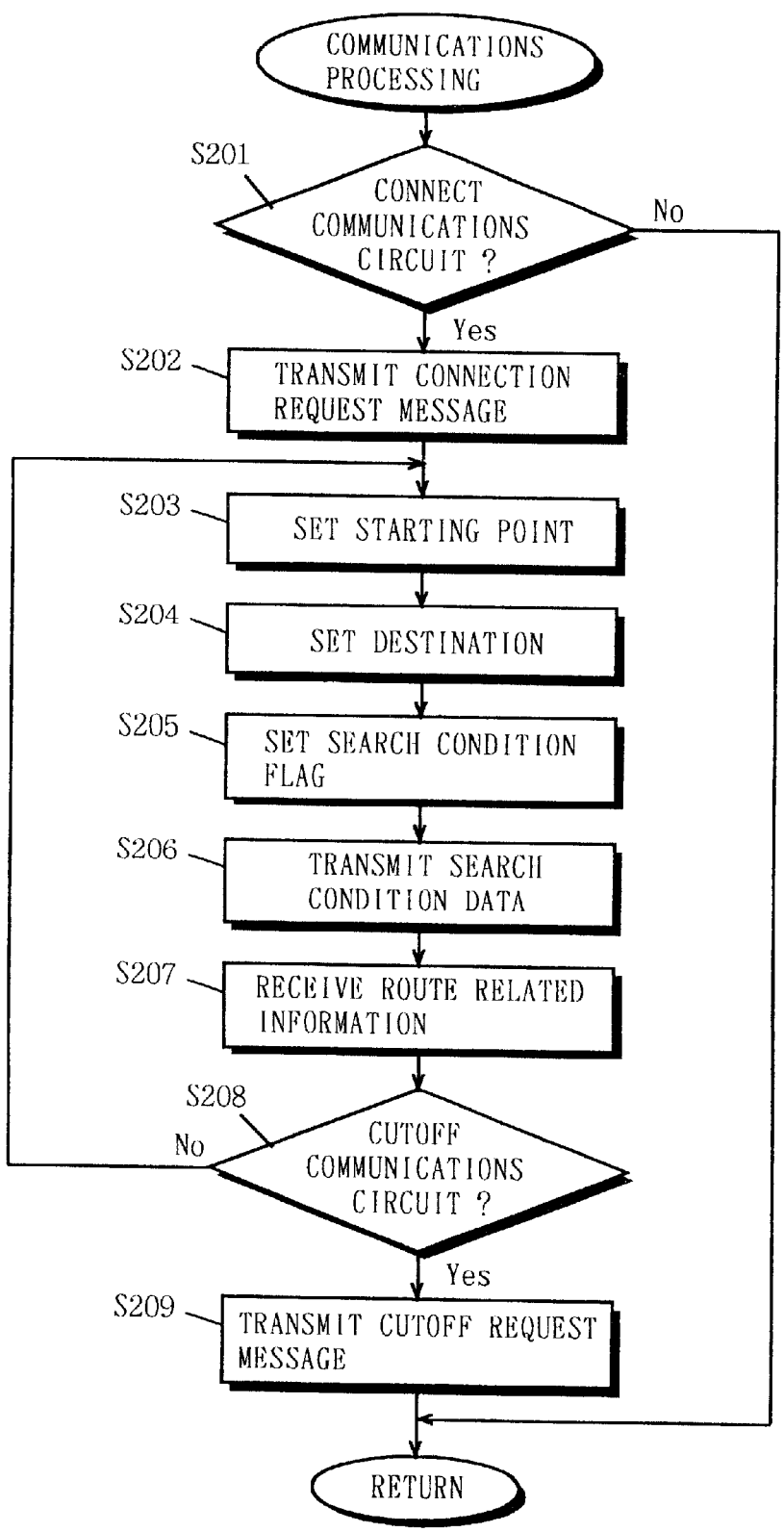
FIG. 4 is a flow chart describing communications processing in step S106 of FIG. 3 in detail.

Next, the processing portion 4 performs telecommunications through the communication portion 8 with the server (step S106) and thereby route related information (described later) is downloaded from the server side to the mobile terminal side. FIG. 4 is a flow chart describing communications processing in step S106 of FIG. 3 in detail. Described below is the processing according to the flow chart.

First, it is determined whether to connect the communications circuit to the server (step S201). It is the driver who makes this determination by a menu operation through the input portion 2. When it is determined to connect the communications circuit between the mobile terminal and the sever, the processing goes to step S202, and when not to connect, the communications processing ends to go on to step S107 in FIG. 3.

Next, the processing portion 4 transmits to the server side a message of a request for connecting the communications circuit (hereinafter referred to as connection request message) through the communication portion 8 (step S202). When the connection request message is received by the server and the communications circuit is connected, the processing portion 4 sets a starting point for route searching processing at the server side (step S203). Here, the present vehicle position calculated at the position calculating portion 1 is set as the starting point of the route. Instead of the present vehicle position, a point arbitrarily selected by the driver may be set as the starting point.

Next, when the driver selects an arbitrary point on the map through the input portion 2, the processing portion 4 sets the point as a destination (step S204). Destination selection can be performed with easy operation through the input portion 2 if, for example, it is previously determined that the center of the screen is the destination.

Next, a search condition flag showing a condition at the time of route search (for example, giving a high priority to general roads or pay roads) is set (step S205). The setting is made in such a way that the driver selects a condition from a plurality of predetermined alternatives through the input portion 2.

Figure 5:
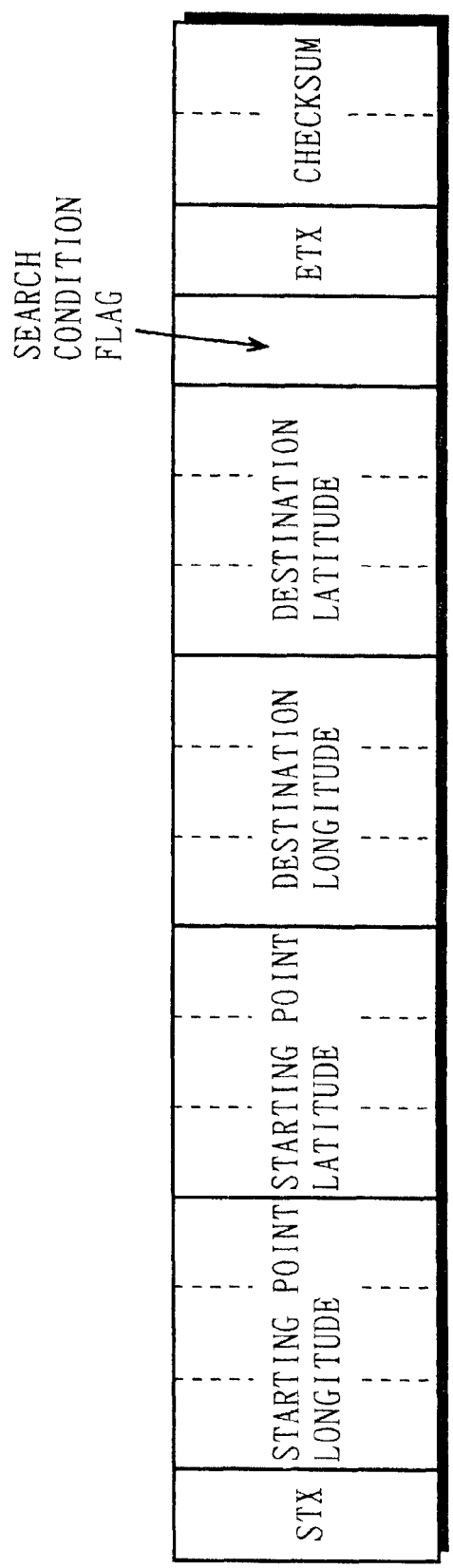
FIG. 5 is a diagram showing a format of search condition data to be transmitted from the mobile terminal side to the server side in the map information providing system of the first embodiment.

Next, the processing portion 4 transmits data including the search conditions of the starting point, the destination, and the search condition flag set in steps S203 to S205 (hereinafter referred to as search condition data) to the server side through the communication portion 8 (step S206). The format of the search condition data is shown in FIG. 5. As shown in FIG. 5, the search condition data is constructed of STX, starting point longitude, starting point latitude, destination longitude, destination latitude, a search condition flag, ETX, and a checksum. The search condition data with this format is transmitted as one packet to the server side.

STX is a flag indicating a start of the data, herein represented by 1 byte. The starting point longitude indicates the longitude of the starting point in, for example, 0.1 seconds, herein represented by 3 bytes. The starting point latitude indicates the latitude of the starting point in, for example, 0.1 seconds, herein represented by 3 bytes. The destination longitude indicates the longitude of the destination in, for example, 0.1seconds, herein represented by 3 bytes. The destination latitude indicates the latitude of the destination in, for example, 0.1seconds, herein represented by 3 bytes.

The search condition flag is a flag indicating a search condition other than the starting point and the destination, herein represented by 1 byte. In the present embodiment, assume that the search condition is whether to give a high priority to pay roads. ETX is a flag indicating an end of the data, herein represented by 1 byte. The checksum is used for error correction at the mobile terminal indicating the sum of the data sizes of STX, the starting point longitude, the starting point latitude, the destination longitude, the destination latitude, the search condition flag, ETX, and the checksum itself, herein represented by 4 bytes.

Figure 6:
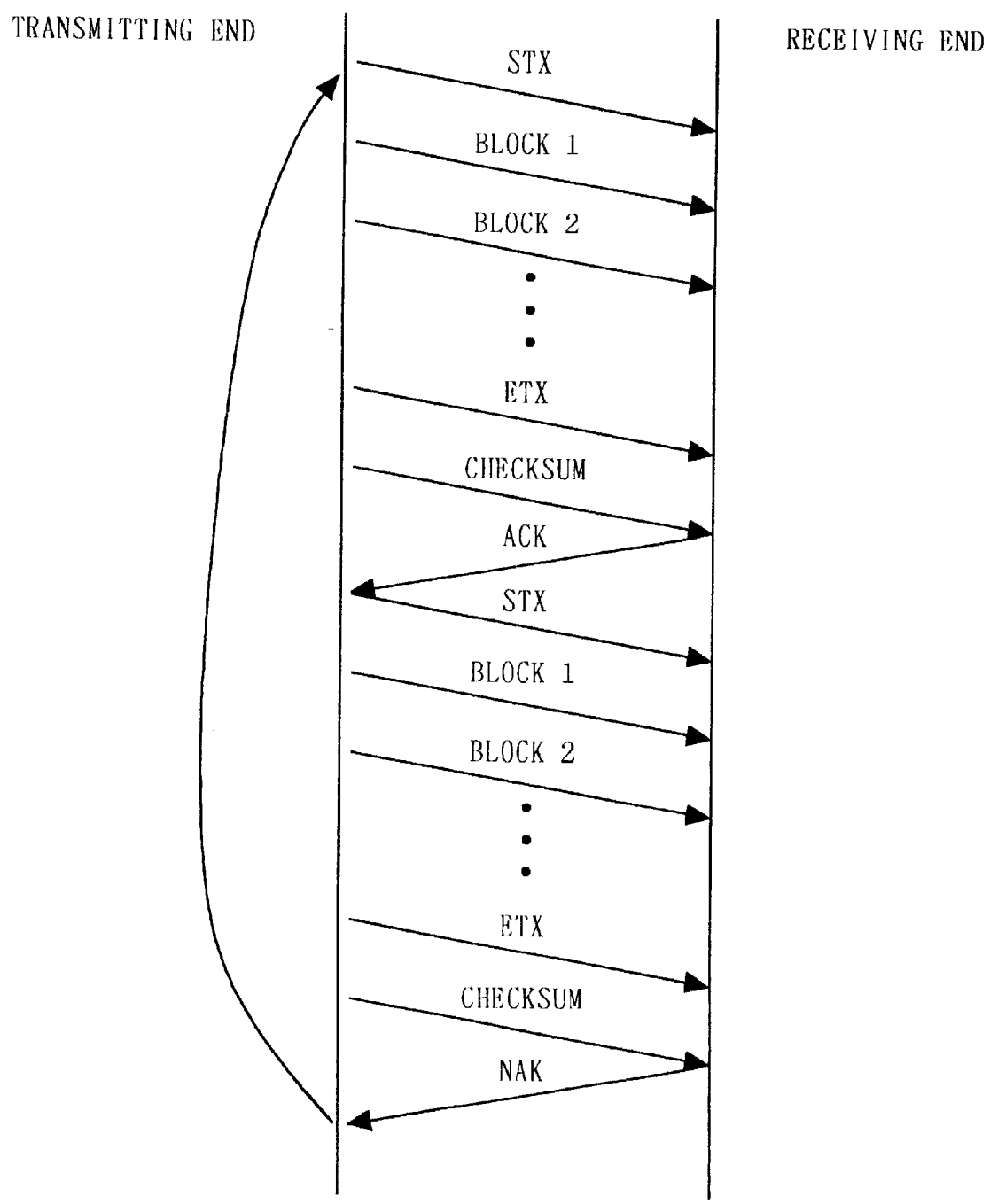
FIG. 6 is a diagram showing the procedure of communications between the mobile terminal side and the server side in the map information providing system of the first embodiment.

The search condition data with the above-described format is transmitted from the mobile terminal side to the server side. The procedure of transmission is described below using FIG. 6. FIG. 6 shows a state in which the data is transmitted/received between the mobile terminal and the server, and the mobile terminal is a transmitting end and the server is a receiving end herein. As shown in FIG. 6, the mobile terminal transmits the search condition data by one block with 1 byte as one block.

On the other hand, the server receives the data by 1 byte, and transmits ACK or NAK to the mobile terminal side in response when receiving one packet of data. ACK is a signal indicating positive acknowledgement, while NAK is a signal indicating negative acknowledgement.

When ACK is transmitted in response from the server side, the mobile terminal determines that the transmitted one packet has been received by the server and transmits the next one packet. On the other hand, when NAK is transmitted in response, the mobile terminal determines that the transmitted one packet has not been received by the server and re-transmits the one packet.

The server side performs route search according to the search condition data transmitted from the mobile terminal side in the above described manner, extracts information related to the route obtained by the search as a result (hereinafter referred to as route related information) from each of the databases (9 to 12), and transmits the extracted information as well as the route to the mobile terminal side. Details of the search processing and extraction processing will be each described later (refer to description of operation of processing at the server side).

Figure 7:
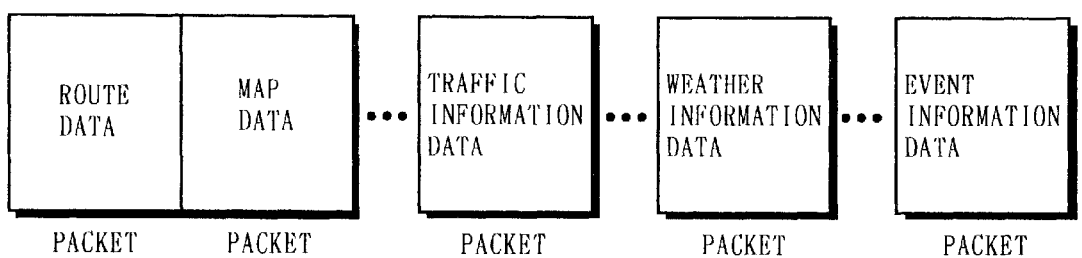
FIG. 7 is diagram showing a format of route related information transmitted from the server side to the mobile terminal side in the map information providing system of the first embodiment.

Next, in the mobile terminal, the processing portion 4 receives the route related information transmitted from the server side through the communication portion 8 (step S207). FIG. 7 shows a format of the route related information. As shown in FIG. 7, the route related information is constructed of a plurality of packets, each packet including any one of route data, map data, traffic information data, weather information data, and event information data.

Figure 8:
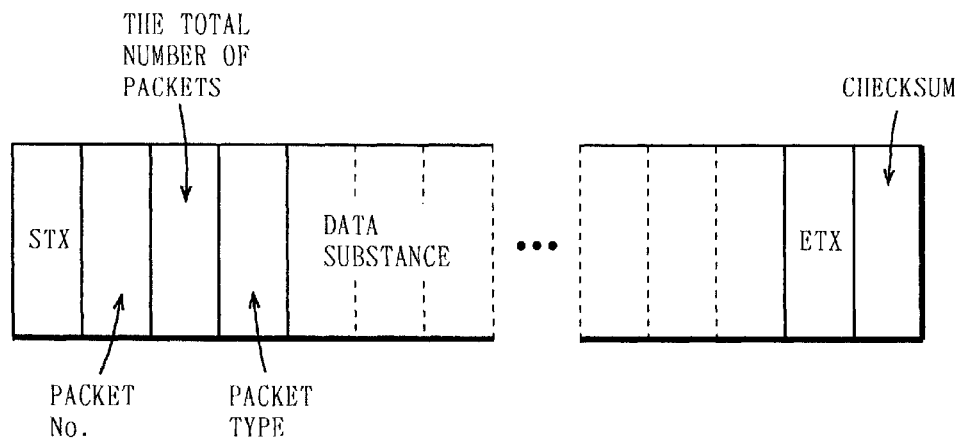
FIG. 8 is a diagram showing a format of a packet constructing the route related information in FIG. 7.

FIG. 8 shows a format of the packet in FIG. 7. As shown in FIG. 8, each packet in FIG. 7 is constructed of STX, a packet number, the total number of packets, a packet type, data substance, EXT, and a checksum. STX is a flag indicating a start of the data, herein represented by 1 byte. The total number of packets indicates the total number of packets to be transmitted, herein represented by 1 byte. Further, the packet number is an identifier indicating its ranking among all packets, herein represented by 1 byte.

The packet type is an identifier indicating a type of the data substance included in the packet, herein represented by 1 byte. In the present embodiment, selected as the packet type are the route data, the map data, the traffic information, the weather information, and the event information. ETX is a flag indicating an end of the data, herein represented by 1 byte. The checksum is used for error correction at the mobile terminal indicating the sum of the data sizes of STX, the packet number, the total number of packets, the packet type, the data substance, ETX, and the checksum itself, herein represented by 4 bytes.

Described below is the procedure of processing the receiving of the route related information in step S207 in FIG. 4 using FIG. 6 in detail. Unlike the above described procedure of transmission of the search condition data, the server is the transmitting end in FIG. 6, while the mobile terminal is the receiving end. As shown in FIG. 6, the mobile terminal receives the route related information by one block with 1 byte as one block.

The processing portion 4 then sequentially adds the sizes of the blocks received through the communication portion 8 to compare the results to the value of the checksum transmitted after ETX indicating the end of the data. When the data size obtained by addition matches the value of the checksum as a result of comparison, the processing portion 4 returns ACK to the server to enter a wait state for receiving the next packet. On the other hand, when they do not match, the processing portion 4 returns NAK to the server to request retransmission of the same packet.

After receiving all packets which constructs the route related information as in the above described manner, the processing portion 4 determines whether to cut off the communications circuit (step S208). When it is determined not to cut off the circuit yet as a result of the determination, the processing returns to step S203 to repeat the processing up to step S208 thereafter. When it is determined to cut off the circuit, the processing goes on to step S209.

Next, the processing portion 4 transmits a message of requesting for cutoff of the communications circuit (hereinafter referred to as cutoff request message) to the server side through communication portion 8 (step S209), thereby cutting off the connected circuit. When acquisition of the route related information ends as in the above described manner, the processing at the mobile terminal side goes on to step S107 in FIG. 3. That is, the processing portion 4 makes the output portion 7 display the route related information downloaded from the server side for the driver (step S107 in FIG. 3).

Next, it is determined at the mobile terminal whether to end the system (step S108) it is the driver who determines this by a menu operation through the input portion 2. When it is determined to end, the processing portion 4 enters operation of ending the system. When it is determined not to end the system yet, the processing portion 4 returns to step S101 to repeat the processing up to step S108 thereafter.

Described next is an operation of processing at the server side according to a flow chart in FIG. 9.

In the server side, the processing portion 15 first receives the communications circuit connection request message transmitted from the mobile terminal side through the communication portion 18 (step S301), and then performs processing for circuit connection to the mobile terminal side based on the connection request message received in step S301 (step S302).

Next, the processing portion 15 receives the search condition data transmitted from the mobile terminal side through the communication portion 18 (step S303). The format and the receiving procedure of the search condition data have been described in the above operation of the mobile terminal side.

Next, the processing portion 15 performs route search processing based on the search condition data received in step S303 (step S304). The route search processing is executed by referring to the map data stored in the map database 9 by an existing method such as the Djikstra method.

At route search, reflecting the traffic information stored in the traffic information database 10, a route avoiding congestion, for example, may be obtained. That is, travel time for each link recorded in the map database 9 is actively changed based on the congestion information and the regulation information read from the traffic information database 10, and the Djikstra method is applied to the changed travel time for each link. The route obtained by route search is represented by a node data string having at least longitude latitude coordinates.

Next, the processing portion 15 searches the map database 9, the traffic information database 10, the weather information database 11, and the event information database 12 to extract only information closely related to the route obtained in step S304 (that is, the route related information) (step S305). The degree of relativeness is determined as follows.

The traffic information, the weather information and the event information stored in the traffic information database 10, the weather information database 11, and the event information database 12, respectively, have longitude and latitude coordinates for relating to positions on the map. As to the information, the processing portion 15 calculates linear dimensions between each of the longitude and latitude coordinates and the node string constructing the route obtained in step S304, and then converts the calculated value in metrics. Then information in which the value obtained by the conversion is not more than a threshold L is determined to be closely related.

The above threshold L is set in the range of 500 m to 5000 m, for example, in view of a transfer rate of the communications circuit, etc. The driver may set an arbitrary value through the input portion 2.

On the other hand, as to the detailed map data of the map database 9, it is determined that data items within a radius M around the starting point and the destination are closely related. The above M is set in the range of 100 m to 500 m, for example, in view of a transfer rate of the communications circuit.

The processing portion 15 then transmits the route obtained in step S304 and the route related information extracted in step S305 to the mobile terminal side through the communication portion 18 (step S306). The structure of the route related information, the format of the packet constructing the route related information, and the procedure of transmission of the route related information each have been described in the above description of the operation at the mobile terminal side.

When transmission of the route related information ends as in the above described manner, the processing portion 15 determines whether or not the cutoff request message from the mobile terminal side is transmitted (step S307). As a result of this determination, when the cutoff request message is not transmitted, the processing returns to step S303 to be in a wait state for receiving the search condition data from the mobile terminal side. When the cutoff request message is transmitted, the processing portion 15 performs processing for cutting off the communications circuit between the server and the mobile terminal (step S308) and then ends the operation.

As described above, according to the present embodiment, the route related information as well as the route obtained by search is downloaded from the server side to the mobile terminal side in one operation, thereby allowing the driver to acquire the route related information without requiring complicated operation.

Furthermore, since the driver needs only the information that is closely related to the route in the map related information, the present embodiment downloads only the route related information. Thus, the amount of information transmitted is reduced compared to that when the whole map related information is downloaded, and as a result it is possible to provide detailed, wide-ranging map related information through telecommunications at low costs.

(2) Second Embodiment

As in the first embodiment, a map information providing system shown in the present embodiment is provided with a server holding various kinds of database such as map data, traffic information, weather information, and event information, and collecting and updating the contents of these databases, and one or more mobile terminals for receiving information-providing services from the server through telecommunications. An optimum route between arbitrary points requested by the mobile terminal is obtained by the server, and in addition to the obtained route, a detailed map, traffic information, weather information, event information, etc., are downloaded in one operation to the mobile terminal.

In the first embodiment, since the map related information provided together with the route includes only the information closely related to the route (route related information) in the information stored in the server side, it is possible to provide detailed, wide-ranging map related information through telecommunications at low costs. However, even if only the route related information is transmitted, when the information includes image data, the amount of information to be transmitted is enormous, and telecommunications do not necessarily have low costs.

Therefore, according to the present embodiment, in the first embodiment, when the map related information can be decomposed into several elements expressed in patterns and further the style of the original map related information composed of these elements can be represented by templates, these elements and templates are stored in the mobile terminal side. Then, IDs for identifying the elements constructing the route related information are transmitted from the server side to the mobile terminal side. Described below is the detail referring to the drawings.

Since the basic structure of the map information providing system at the mobile terminal side of the present embodiment is the same as that of the first embodiment, FIG. 1 is referred for the following description. Further, since the basic structure at the server side is the same as that of the first embodiment, FIG. 2 is also referred.

The basic operation of each element in FIGS. 1 and 2 is the same as that described in the first embodiment. Described below is operation of the map information providing system as structured above. Each step of processing shown in the present embodiment can be realized by a software using a computer or can be realized using a dedicated hardware which performs the processing.

Figure 11:
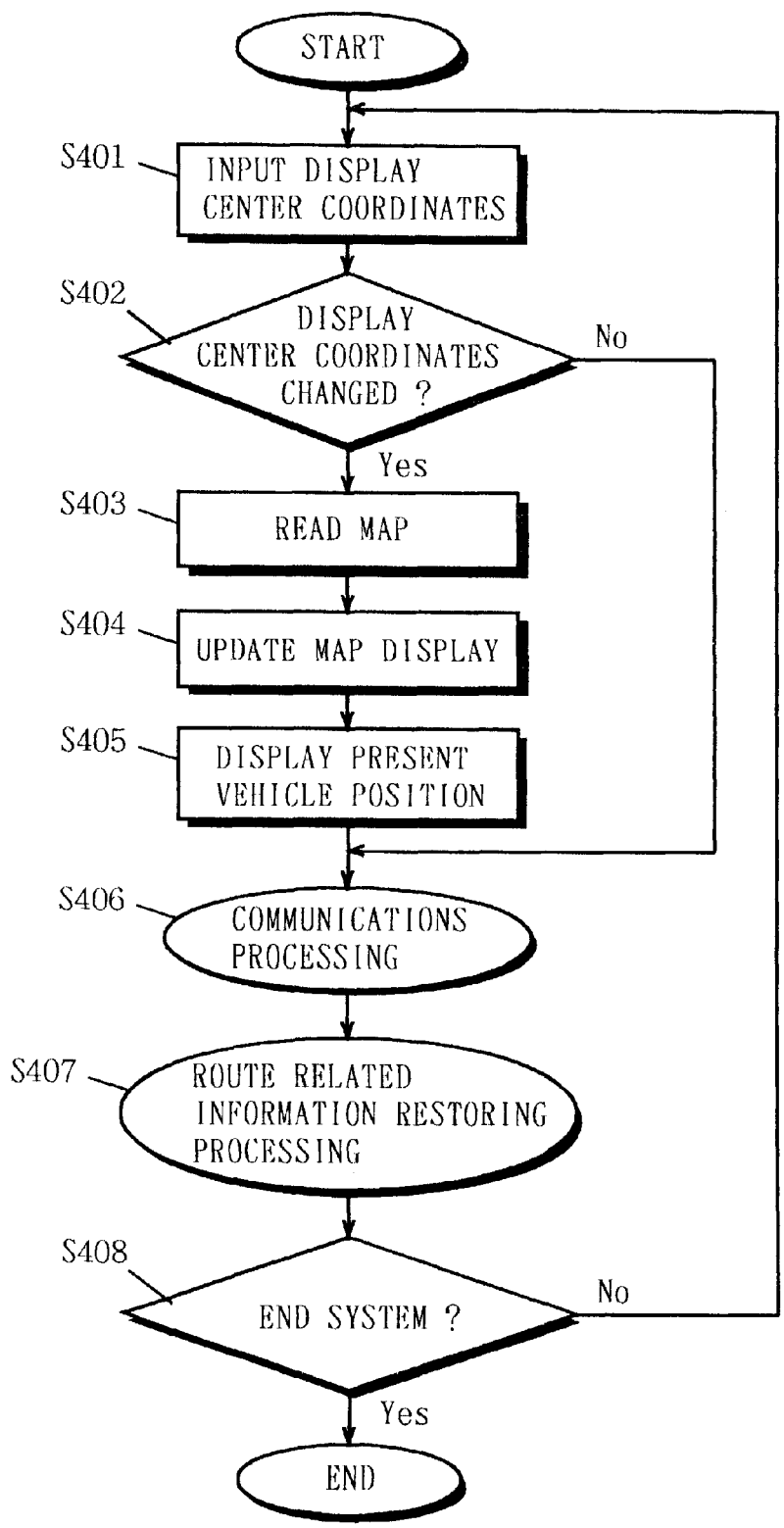
FIG. 11 is a flow chart describing the procedure of processing at the mobile terminal side in the map information providing system of a second embodiment.

FIG. 11 is a flow chart describing the procedure of processing at the mobile terminal side in the map information providing system of the present embodiment. Since the procedure of processing at the server side is the same as that of the first embodiment, the flow chart in FIG. 9 is referred. Described below is the operation of processing of the map information providing system in the present embodiment according to these flow charts.

Described first is the procedure of processing at the mobile terminal side according to the flow chart of FIG. 11.

The steps of processing in steps S401 to S406 are the same as those in steps at S101 to S106 in FIG. 3, respectively. However, unlike in the first embodiment, the route related information downloaded from the server side as a result of the communications processing in step S406 has to be restored at the mobile vehicle side. Next, the processing portion 4 performs processing of restoring the route related information (step S407).

Figure 12:
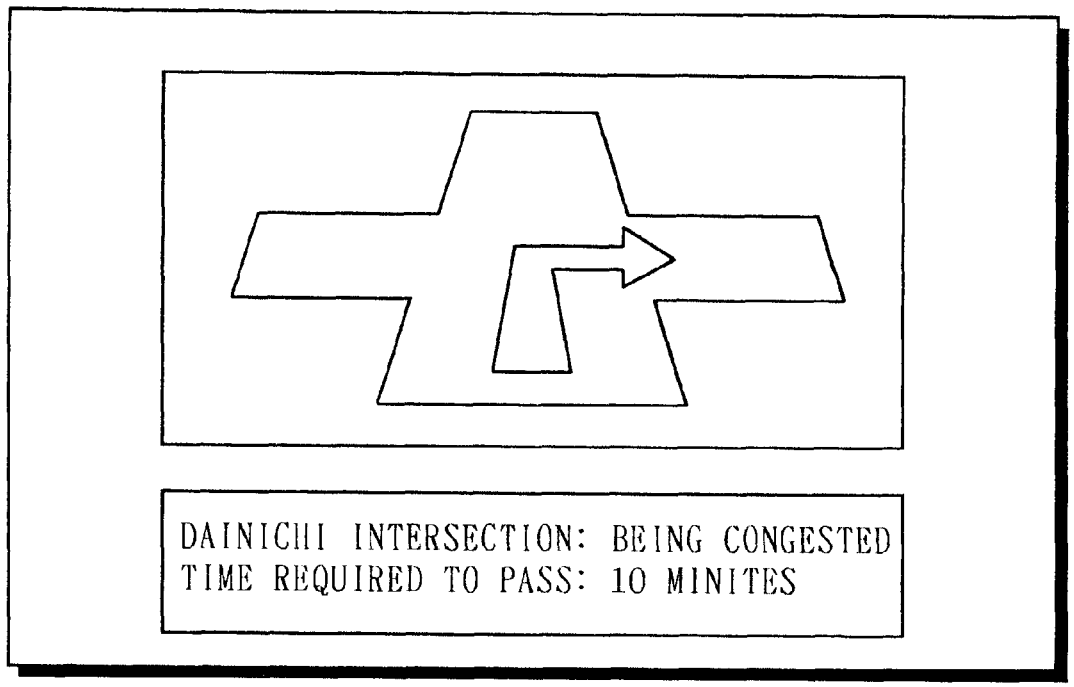
FIG. 12 is a diagram showing an example of an intersection guide sign displayed at the mobile terminal side in the map information providing system of the second embodiment.

Described herein is a summary of the route related information restoring processing in step S407 using an intersection guide sign shown in FIG. 12. The intersection guide sign of FIG. 12 is to provide the driver with the configuration of the intersection, an guide arrow, traffic information in the vicinity of the intersection.

At the server side, as to the intersection guide sign of FIG. 12, the configurations of the intersection and the guide arrows are stored in the map database 9 and the traffic information is stored in the traffic information database 10. On the other hand, in the mobile terminal side, a plurality of elements which construct the intersection guide sign and templates in which style information of the intersection guide sign is described are stored in the map information storage portion 6.

The template is constructed of a type of elements to be displayed (hereinafter referred to as element types), an attribute, display coordinates, and an element ID. In the sign of FIG. 12, there are three element types: the intersection configuration, the guide arrow, and the traffic information, and there are two attributes: a bitmap and a character string. The attribute of the intersection configuration and the guide arrow is a bitmap and the attribute of the traffic information is a character string.

Figure 13:
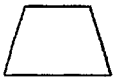
FIG. 13 is a diagram showing a correspondence between elements (bitmaps) and element IDs.
Figure 13:
Figure 13:
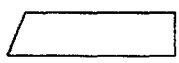
Figure 13:
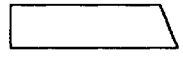
Figure 13:
Figure 13:
Figure 13:
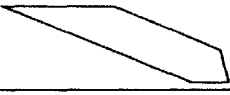
Figure 13:
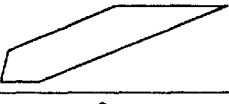
Figure 13:
Figure 13:
Figure 13:
Figure 13:
Figure 13:
Figure 13:
Figure 13:

The elements stored in the map information storage portion 6 are a plurality kinds of bitmaps as shown in FIG. 13, and each element is identified by the element ID. On the other hand, as to the character string, character fonts are stored in the ROM 3, and each character is identified by an ASCII code. Further, the display coordinates are uniquely defined fixed values for each type of the element.

For the intersection guide sign shown in FIG. 12, the route related information downloaded from the server side includes the IDs of the elements which construct the intersection configuration and the guide arrow and the ASCII codes of character strings which construct the traffic information. In the mobile terminal side, the elements and the character fonts corresponding to the element IDs and the ASCII codes are read respectively from the map information storage portion 6 and the ROM 3 to be applied to the template in the map information storage portion 6, thereby restoring the intersection guide sign.

The route related information in the present embodiment also has the same format as that shown in FIG. 7. The format of the packets which constructs the route related information is also the same as that shown in FIG. 8. However, the format of the data substance is different from that in the first embodiment. Therefore, the format of the data substance in the present embodiment is shown in FIG. 14.

Figure 14:
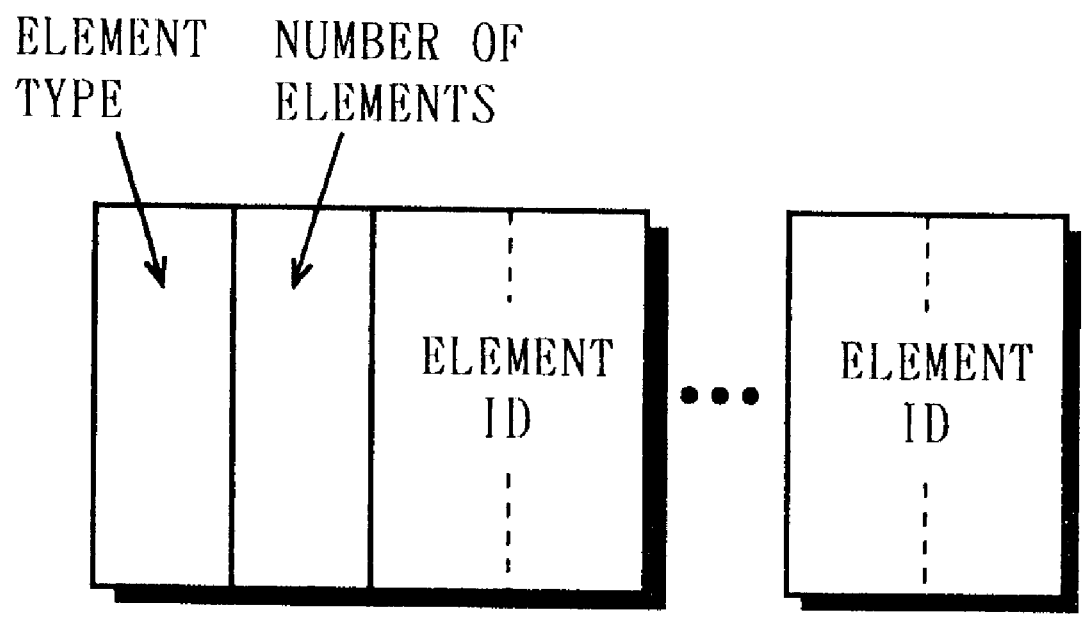
FIG. 14 is a diagram showing a format of data substance included in the packet (FIG. 8) which constructs the route related information (FIG. 7) to be transmitted from the server side to the mobile terminal side in the map information providing system of the second embodiment.

As shown in FIG. 14, the data substance of the route related information is constructed of the element type, the number of elements, and the element ID. The number of elements shows the number of the elements included in the information, represented by 1 byte, for example. The element type is represented by 1 byte, and the element ID is represented by 2 bytes, for example.

Figure 15:
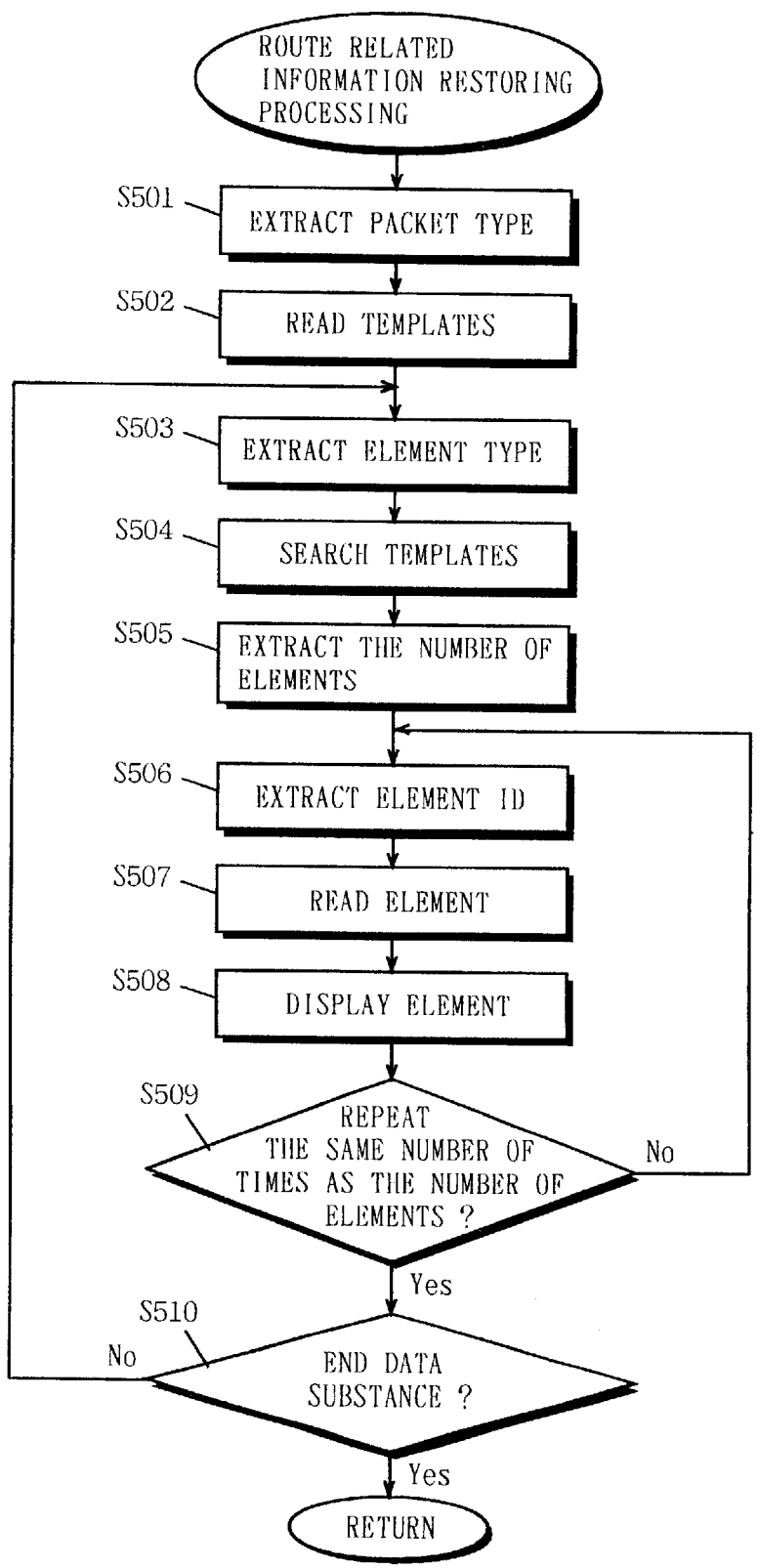
FIG. 15 is a flow chart describing route related information restoring processing (step S407 in FIG. 11) in the second embodiment in detail.

FIG. 15 is a flow chart describing the procedure of the route related information restoring processing in step S407 of FIG. 11 in detail. Described below is the route related information restoring processing in step S407 according to the flow chart.

In the mobile terminal, the processing portion 4 first extracts, from the packet received from the server side through the communication portion 18, an identifier indicating a type of the packet (hereinafter referred to as packet type) (step S501). For example, when the data of the intersection guide sign of FIG. 12 is received as one packet, the packet type is a packet as to the route (hereinafter referred to as route packet).

The processing portion 4 then reads templates corresponding to the packet type extracted in step S501 from the map information storage portion 6 (step S502) and extracts the element type from the data substance of the received packet (step S503). Then, the processing portion 4 searches the templates read in step S502 (step S504) and selects a template including the same element type as that extracted in step S503.

Next, the processing portion 4 extracts the number of elements from the data substance of the received packet (step S505). The number of elements shows the number of bitmaps when the element type has an attribute of a bitmap, while showing the number of characters when the element type has an attribute of a character string. The processing portion 4 then extracts the element ID from the data substance of the received packet (step S506). The element ID shows an ID number for identifying the element stored in the map information storage portion 6 when the element type extracted in step S503 has an attribute of a bitmap, while showing an ASCII code for identifying the character font stored in the ROM 3 when the element type has an attribute of a character string.

Next, the processing portion 4 reads an element having the element ID extracted in step S506 (step S507). At that time, when the element type extracted in step S503 has an attribute of a bitmap, the element (bitmap) applicable to the element ID is read from the map information storage portion 6, and the character font applicable to the ASCII code is read when the element type has an attribute of a character string.

Next, the processing portion 4 makes the output portion 7 display the element read in step S507 for the driver (step S508). At that time, the bitmap read in step S507 is displayed when the element type extracted in step S503 has an attribute of a bitmap, and the character font is displayed when the element type has an attribute of a character string.

Next, the processing portion 4 determines whether the processing in steps S506 to S508 has been repeated the same number of times as the number of the elements extracted in step S503 (step S509). As a result of this determination, when the processing has not yet been repeated the same number of times as the number of elements, the processing portion 4 returns to step S506 to repeat the processing up to step S509 thereafter. When the processing has been repeated the same number of times as the number of elements, the processing portion 4 goes on to step S510.

Next, the processing portion 4 determines whether the whole data substance in one packet downloaded from the server side has been read (step S510). As a result of determination, when the whole data has not yet been read, the processing portion 4 returns to step S503 to repeat the processing up to step S510 thereafter. When the whole data has been read, the processing portion 4 ends the route related information restoring processing to go on to step S408 in FIG. 11.

Next, the processing portion 4 determines whether or not to end the operation of the system (step S408 in FIG. 11). When it is determined not to end the system, the processing portion 4 returns to step S401 to repeat the processing up to step S408 thereafter.

Described next is the procedure of processing at the server side according to the flow chart in FIG. 9.

The steps of processing in steps S301 to S308 are the same as those described in the first embodiment. However, in step S306, the processing portion 15 further converts the route related information extracted in step S305 into the IDs capable of identifying the elements which construct the information. Furthermore, data substance of the transmitted route related information is different from that of the first embodiment, which has been described in the route related information restoring processing at the mobile terminal side.

As described above, according to the present embodiment, the route related information as well as the route obtained by search is downloaded from the server side to the mobile terminal in one operation, thereby allowing the driver to acquire the route related information without requiring a complicated operation.

Furthermore, since the driver needs only the information that is closely related to the route in the map related information, the present embodiment downloads only the route related information. Thus, the amount of information transmitted is reduced compared to that when the whole map related information is downloaded, and as a result it is possible to provide detailed, wide-ranging map related information through telecommunications at low costs.

Furthermore, the present embodiment converts the route related information into the IDs of the elements which construct the information and then transmits the results, thereby greatly reducing the amount of information to be transmitted.

In addition, the present embodiment performs the route related information restoring processing based on the templates, allowing a reduction in processing operation at the mobile terminal side. Further, it is not required to transmit the display coordinates and display colors of the elements, reducing the amount of information to be transmitted.

(3) Third Embodiment

As in the first embodiment (and the second embodiment), a map information providing system shown in the present embodiment is provided with a server holding various kinds of databases such as map data, traffic information, weather information, and event information, and collecting and updating the contents of these databases, and one or more mobile terminals for receiving information-providing services from the server through telecommunications. An optimum route between arbitrary points requested by the mobile terminal is obtained by the server, and in addition to the obtained route, a detailed map, traffic information, weather information, event information, etc., are downloaded in one operation to the mobile terminal.

In the first embodiment (and the second embodiment), since the map related information provided together with the route only includes the information most related to the route (route related information) in the information stored in the server side, it is possible to provide detailed, wide-ranging map related information through telecommunications at low costs. Further, in the second embodiment, the elements and the templates of the map related information are stored in the mobile terminal side, and the IDs for identifying the elements are transmitted from the server side to the mobile terminal side to substantially reduce the amount of information to be transmitted. However, as the information to be provided becomes more detailed, the number of IDs to be transmitted increases, resulting in increased telecommunications costs.

Thus, according to the present embodiment, in the second embodiment, command programs for processing the elements are further stored in the mobile terminal side. Then, in addition to the IDs of the elements, a command ID for identifying the command program is transmitted from the server side to the mobile terminal side. Described below is the detail referring to the drawings.

Since the basic structure of the map information providing system at the mobile terminal side of the present embodiment is the same as that of the second embodiment, FIG. 1 is referred for the following description. Further, since the basic structure at the server side is the same as that of the second embodiment, FIG. 2 is also referred.

The basic operation of each element in FIGS. 1 and 2 is the same as that described in the second embodiment. Described below is the operation of the map information providing system as structured above. Each step of processing shown in the present embodiment can be realized by a software using a computer or can be realized using a dedicated hardware which performs the processing.

Since the procedure of processing at the mobile terminal side of the map information providing system of the present embodiment is the same as that of the second embodiment, the flow chart in FIG. 11 is referred. Since the procedure of processing at the server side is also the same as that of the second embodiment, the flow chart in FIG. 9 is referred. Described below is the operation of processing of the map information providing system in the present embodiment according to these flow charts.

Described first is the procedure of processing at the mobile terminal side according to the flow chart of FIG. 11.

The steps of processing in steps S401 to S406 are the same as those described in the second embodiment. The processing in step S407 is also the same as that described in the second embodiment except that it further includes processing the elements based on the command ID downloaded from the server side.

Figure 16:
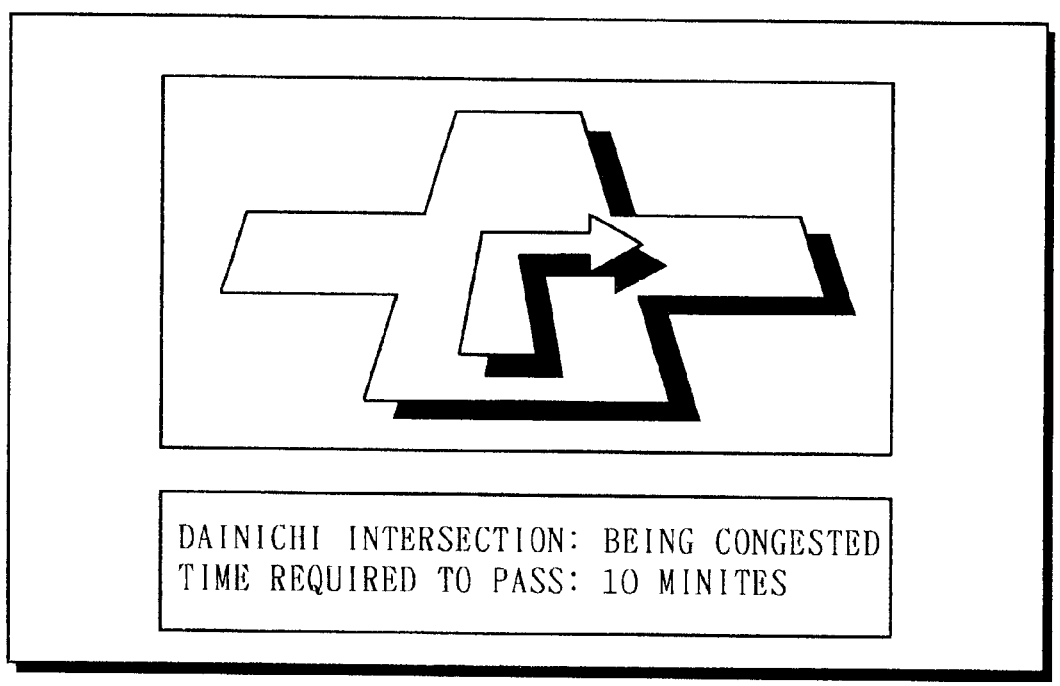
FIG. 16 is a diagram showing an example of an intersection guide sign shown at the mobile terminal side in the map information providing system of a third embodiment.

Therefore, described is the processing of the elements using an intersection guide sign shown in FIG. 16. Although the intersection guide sign of FIG. 16 is, like the one in FIG. 12, to provide the driver with the configuration of the intersection, a guide arrow, and traffic information in the vicinity of the intersection, the sign of FIG. 16 is different in that the intersection and the arrow are stereoscopically displayed.

At the server side, in the second embodiment, a plurality of commands for subjecting the elements to prescribed processing (including a command for shading intersections and arrows) are further stored in the ROM 14. On the other hand, at the mobile terminal side, command programs for subjecting the elements to prescribed processing (including a command program for shading intersections and arrows) is further stored in the map information storage portion 6.

For the intersection guide sign shown in FIG. 16, the route related information downloaded from the server side includes the IDs of the elements which construct the intersection configuration and the guide arrow, the ASCII codes of the character strings which construct the traffic information, and the command ID for shading intersections and arrows. When the mobile terminal side receives the route related information, the element IDs included in the information, and the elements and the command program corresponding to the command ID are read from the map information storage portion 6 and the character fonts corresponding to the ASCII codes are read from the ROM 3. Then, the read elements and character fonts are applied to the template, and the command program is started to shade the elements, thereby restoring the intersection guide sign.

Figure 17:
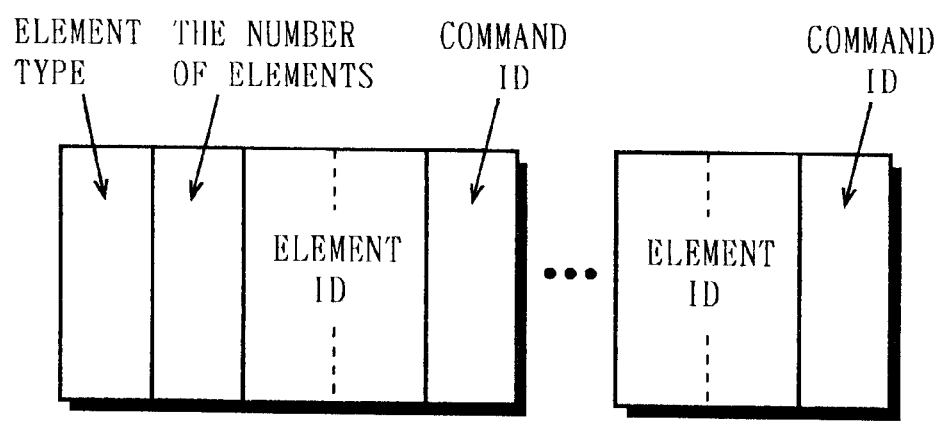
FIG. 17 is a diagram showing a format of data substance included in the packet (FIG. 8) which constructs the route related information (FIG. 7) to be transmitted from the server side to the mobile terminal side in the map information providing system of the third embodiment.

The route related information of the present embodiment also has the same format as that shown in the second embodiment (FIG. 7). The format of the packet which constructs the route related information is also the same as that shown in the second embodiment (FIG. 8). However, the format of the data substance in FIG. 8 is different from that in the second embodiment (FIG. 14). Therefore, the format of the data substance in the present embodiment is shown in FIG. 17. The data substance of FIG. 17 further includes, in the data substance of FIG. 14, the command IDs. The command ID is an ID number capable of identifying each of a plurality of commands for subjecting the elements to prescribed processing, included together with the element ID and represented by 1 byte, for example.

Figure 18:
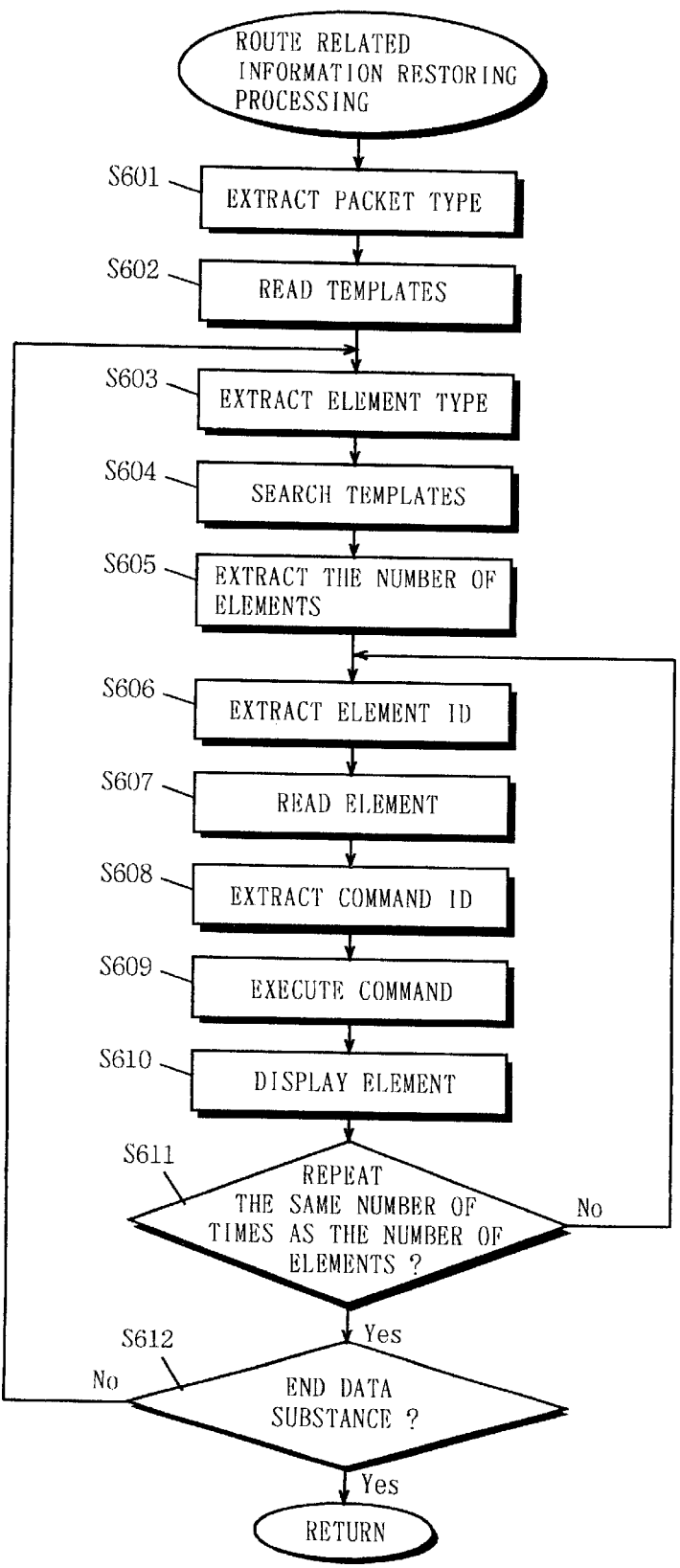
FIG. 18 is a flow chart describing the route related information restoring processing (step S407 in FIG. 11) in the third embodiment in detail.

FIG. 18 is a flow chart describing the procedure of the route related information restoring processing in step S407 in FIG. 11 in detail. Described below is the route related information restoring processing of step S407 according to the flow chart.

The steps of processing in steps S601 to S607 correspond to steps S501 to S507 in FIG. 15, respectively. Next, the processing portion 4 extracts the command ID from the received packet (step S608). Then, the processing portion 4 reads a command program corresponding to the extracted ID from the map information storage portion 6 to execute the command on the element extracted in step S607 (step S609).

Next, the processing portion 4 makes the output portion 7 display the element processed in step S609 for the driver (step S610). At that time, when the element type extracted in step S603 has an attribute of a bitmap, the bitmap read in step S607 is displayed, and the character font is displayed when the element type has an attribute of a character string.

Next, the processing portion 4 determines whether or not the processing in steps S606 to S610 has been repeated the same number of times as the number of elements extracted in step S605 (step S611). As a result of this determination, when the processing has not yet been repeated the same number of times as the number of elements, the processing portion 4 returns to step S606 to repeat the processing up to step S611 thereafter. When the processing has been repeated the same number of times as the number of elements, the processing portion 4 goes on to step S612.

Next, the processing portion 4 determines whether the whole data substance in one packet downloaded from the server side has been read (step S612). As a result of this determination, when the whole data has not yet been read, the processing portion 4 returns to step S603 to repeat the processing up to step S612 thereafter. When the whole data has been read, the processing portion 4 ends the route related information restoring processing to go on to step S408 in FIG. 11.

Next, the processing portion 4 determines whether or not to end the operation of the system (step S408 in FIG. 11). As a result of this determination, when it is determined not to end the system, the processing portion 4 returns to step S401 to repeat the processing up to step S408 thereafter.

Described next is the procedure of processing at the server side according to the flow chart in FIG. 9.

The steps of processing in steps S301 to S308 are the same as those described in the second embodiment. However, in step S306, data substance of the transmitted route related information is different from that of the second embodiment, which has been described in the route information restoring processing at the mobile terminal side.

As described above, according to the present embodiment, the route related information as well as the route obtained by search is downloaded from the server side to the mobile terminal side in one operation, thereby allowing the driver to acquire the route related information without requiring a complicated operation.

Furthermore, since the driver needs only the information that is closely related to the route in the map related information, the present embodiment downloads only the route related information. Thus, the amount of information transmitted is reduced compared to that when the whole map related information is downloaded, and as a result it is possible to provide detailed, wide-ranging map related information through telecommunications at low costs.

Furthermore, the present embodiment converts the route related information into the IDs of the elements which construct the information and then transmits the results, thereby greatly reducing the amount of information to be transmitted.

In addition, the present embodiment performs the route related information restoring processing based on the templates, allowing a reduction in processing operation at the mobile terminal side. Further, it is not required to transmit the display coordinates and display colors of the elements, reducing the amount of information to be transmitted.

Still further, since the present embodiment processes the elements at the mobile terminal side, it is possible to provide more detailed information with a minimum increase in the amount of information to be transmitted. Also, the present embodiment converts the command for processing into the IDs of the command and then transmits the results, allowing a reduction in the amount of information to be transmitted.

In the present embodiment, the command programs are previously stored in the map information storage portion 6. Alternatively, for example, a new command program may be downloaded from the server side to be added to the command programs stored in the mobile terminal side or to update the stored command programs. Thus, it is possible to provide the latest, wide-ranging information.

Furthermore, although only the command for shading the element is described in the present embodiment, the command is not limited to this if the command is for processing the element.

In the first embodiment, the bitmap is described as an example of the element. Alternatively, vector data, etc. representing the same information contents may be used.

Further, in the second and third embodiments, the route related Information is converted into the IDs of the elements which construct the information and then transmitted. Alternatively, the route related information may be converted into IDs of the information and then transmitted. In this case, although the effect that the amount of information to be transmitted is substantially reduced can be obtained, the mobile terminal side has to store the same map related information as that in the server side, thereby requiring a memory or a hard disk with large capacity.

Still further, in the second and third embodiments, the elements are previously stored in the map information storage portion 6. Alternatively, for example, the elements may be downloaded from the server side to be added to the elements stored in the mobile terminal side or to update the stored elements. Thus, the elements at the mobile terminal side are also added/updated according to addition/update of the map related information at the server side, and thereby it is possible to provide the latest, wide-ranging information.

Still further, in the second and third embodiments, the templates are previously stored in the map information storage portion 6. Alternatively, for example, the templates may be downloaded from the server side to be added to the templates stored in the mobile terminal side or to update the stored templates. Thus, the templates at the mobile terminal side are also added/updated according to addition/update of the map related information at the server side, and thereby it is possible to provide the latest, wide-ranging information.

Still further, although in the second and third embodiments, the types of the elements shown in FIG. 13 are stored in the map information storage portion 6, more various types of elements may be stored therein.

Still further, although in the second and third embodiments, only the intersection guide signs in FIGS. 12 and 16 are described as the route related information, the information is not limited to these if the information can be constructed by the data extracted from each database (9 to 12). In the first to third embodiments, the map information providing system is provided with a server and one or more mobile terminals. Alternatively, it is possible to obtain the same effect as in the above if the system is provided with a server and one or more movable terminals. However, a memory or a hard disk with comparatively small capacity is installed in the mobile terminal because of the limitation of capacity. Thus, reduction in the amount of information to be transmitted/stored is highly required, and therefore when the movable terminal is a mobile terminal, the effect obtained by reduction is also significant.

Furthermore, when the movable terminal is a portable terminal, the capacity is much smaller than that of the mobile terminal, and therefore the effect obtained is extremely significant.

Further, in the first to third embodiments, the map related information stored in the server side includes information on a detailed map, traffic, weather, and event. However, the information is not limited to this only if the information is map related information which can be provided for the driver. For example, stored in the server side may be databases such as information on vacant parking lots and conditions of reservations for a restaurant, from which the information in the vicinity of the route is selected to be provided for the mobile terminal side.

Furthermore, although the first to third embodiments set the starting point and the destination and obtain a route therebetween, the system may set a passing point and select a route in view of the passing point. In this case, in addition to the detailed maps in the vicinity of the starting point and the destination, the detailed map in the vicinity of the passing point may be downloaded from the server side to the mobile terminal side.

Furthermore, in the first to third embodiments, the setting of the destination is performed by specifying a position on the map. However, the setting may be performed by searching names of places or selecting one among a plurality of points previously registered.

While the invention has been described in detail, the foregoing description is in all aspects illustrative and not restrictive. It is understood that numerous other modifications and variations can be devised without departing from the scope of the invention.

What is claimed is:

1. A map information providing system for providing map information, said system comprising:
   a server and one or more movable terminals, wherein the map information is provided from said server to said one or more movable terminals;
   said server comprising:
      an information storage portion operable to store map related information including the map information;
      a route searching portion operable to perform a route search by referring to the map information based on a position information of which said server is notified by said one or more movable terminals;
      a route related information extracting portion operable to extract only information about areas surrounding a route obtained by a search performed by said route searching portion from the map related information stored in said information storage portion; and
      a communication portion operable to notify said one or more movable terminals of the route related information obtained by an extraction performed by said route related information extracting portion through telecommunications;
   wherein the map related information has latitude and longitude coordinates to point a location on the map, and wherein said route related information extracting portion is operable to calculate a linear distance between the latitude and longitude coordinates of each information item and a node constructing the route and extract an information item if the calculated distance is not more than a threshold.

2. A map information providing system as claimed in claim 1, wherein each of said one or more movable terminals is a mobile terminal.

3. A map information providing system as claimed in claim 1, wherein each of said one or more movable terminals is a portable terminal.

4. A map information providing system as claimed in claim 1, wherein said communication portion is operable to notify said one or more movable terminals of the route related information obtained by extraction performed by said route related information extracting portion by converting the information into an identifier capable of identifying the information; and
   wherein each of said one or more movable terminals comprises:
      a terminal side information storage portion operable to store map related information equal to the map related information stored in said information storage portion; and
      an information reading portion operable to read information corresponding to the identifier of which said one or more movable terminals are notified by said server from the map related information stored in said terminal side information storage portion.

5. A map information providing system as claimed in claim 4, wherein each of said one or more movable terminals is a mobile terminal.

6. A map information providing system as claimed in claim 4, wherein each of said one or more movable terminals is a portable terminal.

7. A map information providing system as claimed in claim 1, wherein said communication portion is operable to notify said one or more movable terminals of the route related information obtained by extraction performed by said route related information extracting portion by converting the information into a group of identifiers capable of identifying one or more elements which construct the map information; and
   wherein each of said one or more movable terminals comprises:
      a terminal side information storage portion operable to store elements which construct map related information equal to the map related information stored in said information storage portion; and
      an element reading portion operable to read one or more elements corresponding to the group of identifiers of which said one or more movable terminals are notified by said server from the elements stored in said terminal side information storage portion.

8. A map information providing system as claimed in claim 7, wherein each of said one or more movable terminals is a mobile terminal.

9. A map information providing system as claimed in claim 7, wherein each of said one or more movable terminals is a portable terminal.

10. A map information providing system as claimed in claim 7, further comprising:
    an element updating/adding portion operable to update the elements stored in said terminal side information storage portion or to add a new element to the elements stored in said terminal side information storage portion as the map related information stored in said information storage portion is updated or new information is added to the map related information stored in said information storage portion.

11. A map information providing system as claimed in claim 7, wherein each of said one or more movable terminals further comprises:
    a template storage portion operable to store templates showing a structure of the map related information stored in said information storage portion; and
    a restoring portion operable to restore the one or more elements read by said element reading portion to map related information equal to the map related information stored in said information storage portion based on the template stored in said template storage portion.

12. A map information providing system as claimed in claim 11, wherein each of said one or more movable terminals is a mobile terminal.

13. A map information providing system as claimed in claim 11, wherein each of said one or more movable terminals is a portable terminal.

14. A map information providing system as claimed in claim 11, further comprising:
    a template updating/adding portion operable to update the templates stored in said template storage portion or to add a new template to the templates stored in said template storage portion as the map related information stored in said information storage portion is updated or new information is added to the map related information stored in said information storage portion.

15. A map information providing system as claimed in claim 7, said server further comprising:
   a command storage portion operable to store commands for subjecting the elements stored in said terminal side information storage portion to prescribed processing;
   a converting portion operable to convert the command stored in said command storage portion into an identifier capable of identifying the command; and
   a portion operable to notify said one or more movable terminals of the identifer obtained by a conversion performed by said converting portion through telecommunications; and
   each of said one or more movable terminals further comprises:
      a command program storage portion operable to store programs for executing the commands stored in said command storage portion; and
      a program reading portion operable to read a program corresponding to the identifier of which said one or more movable terminals are notified by said server from the programs stored in said command program storage portion.

16. A map information providing system as claimed in claim 15, wherein each of said one or more movable terminals is a mobile terminal.

17. A map information providing system as claimed in claim 15, wherein each of said one or more movable terminals is a portable terminal.

18. A map information providing system as claimed in claim 15, further comprising:
   a program updating/adding portion operable to update the programs stored in said command program storage portion or to add a new program to the programs stored in said command program storage portion as the commands stored in said command storage portion are updated or a new command is added to the commands stored in said command storage portion.

19. A map information providing system as claimed in claim 1, wherein the map related information comprises traffic information in addition to map information, weather information, and event information.

20. A method for providing map information for one or more movable terminals, said method comprising:
   previously storing map related information including the map information;
   searching for a route referring to the map information based on position information transmitted from the one or more movable terminals;
   extracting only information about areas surrounding the route obtained by said searching from the map related information; and
   notifying the one or more movable terminals of the route related information obtained by said extraction through telecommunications;
   wherein the map related information has latitude and longitude coordinates to point a location on the map, and said method further comprising calculating a linear distance between the latitude and longitude coordinates of each information item and a node constructing the route, and extracting an information item if the calculated distance is not more than a threshold.

21. A method as claimed in claim 20, wherein the map related information comprises traffic information in addition to map information, weather information, and event information.

22. A computer program embodied on a computer readable medium for execution in a server, said computer program for providing map information from the server to one or more movable terminals, and said server having stored therein map related information including the map information, said computer program comprising:
   computer readable program code operable to cause the server to search for a route referring to the map information based on position information transmitted from the one or more movable terminals;
   computer readable program code operable to cause the server to extract only information about areas surrounding the route obtained by a search from the map related information; and
   computer readable program code operable to cause the server to notify the one or more movable terminals of the route related information obtained by extraction through telecommunications;
   wherein the map related information has latitude and longitude coordinates to point a location on the map, and said computer program further comprises computer readable program code operable to cause the server to calculate a linear distance between the latitude and longitude coordinates of each information item and a node constructing the route, and computer readable program code operable to cause the server to extract an information item if the calculated distance is not more than a threshold.

23. A computer program as claimed in claim 22, wherein the map related information comprises traffic information in addition to map information, weather information, and event information.

24. A map information providing system for providing map information, said system comprising:
   a server and one or more movable terminals, wherein the map information is provided from said server to said one or more movable terminals;
   said server comprising:
      an information storage portion operable to store map related information including the map information;
      a first converting portion operable to convert the information stored in said information storage portion into an identifier capable of identifying the information; and
      a portion operable to notify said one or more movable terminals of the identifier obtained by a conversion performed by said first converting portion through telecommunications; and
   each of said one or more movable terminals comprises:
      a terminal side information storage portion operable to store map related information equal to the map related information stored in said information storage portion; and
      an information reading portion operable to read information corresponding to the identifier transmitted from said server from the map related information stored in said terminal side information storage portion.

25. A map information providing system as claimed in claim 24, wherein each of said one or more movable terminals is a mobile terminal.

26. A map information providing system as claimed in claim 24, wherein each of said one or more movable terminals is a portable terminal.

27. A map information providing system for providing map information, said system comprising:

a server and one or more movable terminals, wherein the map information is provided from said server to said one or more movable terminals;

said server comprising:
an information storage portion operable to store map related information including the map information;
a first converting portion operable to convert the information stored in said information storage portion into a group of identifiers capable of identifying one or more elements which construct the information; and
a portion operable to notify said one or more movable terminals of the group of identifiers obtained by conversion performed by said first converting portion through telecommunications; and each of said one or more movable terminals comprises:
a terminal side information storage portion operable to store elements which construct map related information equal to the map related information stored in said information storage portion; and
an element reading portion operable to read one or more elements corresponding to the group of identifiers of which the one or more movable terminals are notified by said server from the elements stored in said terminal side information storage portion.

28. A map information providing system as claimed in claim 27, wherein each of said one or more movable terminals is a mobile terminal.

29. A map information providing system as claimed in claim 27, wherein each of said one or more movable terminals is a portable terminal.

30. A map information providing system as claimed in claim 27, further comprising:

an element updating/adding portion operable to update the elements stored in said terminal side information storage portion or to add a new element to the elements stored in said terminal side information storage portion as the map related information stored in said information storage portion is updated or new information is added to the map related information stored in said information storage portion.

31. A map information providing system as claimed in claim 27, wherein each of said one or more movable terminals further comprises:

a template storage portion operable to store templates showing a structure of the map related information stored in said information storage portion; and
a restoring portion operable to restore the one or more elements read by said element reading portion to map related information equal to the map related information stored in said information storage portion based on the template stored in said template storage portion.

32. A map information providing system as claimed in claim 31, wherein each of said one or more movable terminals is a mobile terminal.

33. A map information providing system as claimed in claim 31, wherein each of said one or more movable terminals is a portable terminal.

34. A map information providing system as claimed in claim 31, further comprising:

a template updating/adding portion operable to update the templates stored in said template storage portion or to add a new template to the templates stored in said template storage portion as the map related information stored in said information storage portion is updated or new information is added to the map related information stored in said information storage portion.

35. A map information providing system as claimed in claim 27, said server further comprising:

a command storage portion operable to store commands for subjecting the elements stored in said terminal side information storage portion to prescribed processing;
a second converting portion operable to convert the command stored in said command storage portion into an identifier capable of identifying the command; and
a portion operable to notify said one or more movable terminals of the identifier obtained by a conversion performed by said converting portion through telecommunications; and each of said one or more movable terminals further comprises:
a command program storage portion operable to store programs for executing the commands stored in said command storage portion; and
a program reading portion operable to read a program corresponding to the identifier of which said one or more movable terminals are notified by said server from the programs stored in said command program storage portion.

36. A map information providing system as claimed in claim 35, wherein each of said one or more movable terminals is a mobile terminal.

37. A map information providing system as claimed in claim 35, wherein each of said one or more movable terminals is a portable terminal.

38. A map information providing system as claimed in claim 35, further comprising:

a program updating/adding portion operable to update the programs stored in said command program storage portion or to add a new program to the programs stored in said command program storage portion as the commands stored in said command storage portion are updated or a new command is added to the commands stored in said command storage portion.

* * * * *